US009479661B2

(12) United States Patent
Watanabe

(10) Patent No.: US 9,479,661 B2
(45) Date of Patent: *Oct. 25, 2016

(54) IMAGE-READING DEVICE DETECTING EDGE OF SHEET BY SETTING MASK REGION INCLUDING PART OF LINES

(71) Applicant: Brother Kogyo Kabushiki Kaisha, Nagoya-shi, Aichi-ken (JP)

(72) Inventor: Toshihiro Watanabe, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/730,674

(22) Filed: Jun. 4, 2015

(65) Prior Publication Data

US 2015/0373218 A1 Dec. 24, 2015

(30) Foreign Application Priority Data

Jun. 18, 2014 (JP) ................................ 2014-125590

(51) Int. Cl.
H04N 1/04 (2006.01)
H04N 1/00 (2006.01)

(52) U.S. Cl.
CPC ...... *H04N 1/00705* (2013.01); *H04N 1/00737* (2013.01); *H04N 1/00748* (2013.01); *H04N 1/00766* (2013.01); *H04N 1/00769* (2013.01); *H04N 2201/0081* (2013.01)

(58) Field of Classification Search
None
See application file for complete search history.

(56) References Cited

U.S. PATENT DOCUMENTS

| | | | | | |
|---|---|---|---|---|---|
| 4,555,801 A | * | 11/1985 | Miyagawa | ........... | G06K 9/4647 382/291 |
| 5,123,085 A | * | 6/1992 | Wells | .................... | G06T 15/503 345/421 |
| 5,222,157 A | * | 6/1993 | Yoneda | ............. | G06F 17/30017 358/403 |
| 5,754,304 A | * | 5/1998 | Endo | ...................... | G06K 15/02 358/528 |
| 5,796,496 A | * | 8/1998 | Ono | .................... | H04N 1/00962 358/400 |
| 5,867,261 A | * | 2/1999 | Imaino | ............... | G01N 21/9506 348/128 |
| 5,883,724 A | * | 3/1999 | Yamada | ............ | H04N 1/00915 355/127 |

(Continued)

FOREIGN PATENT DOCUMENTS

| | | |
|---|---|---|
| JP | H09-321983 A | 12/1997 |
| JP | H11-177774 A | 7/1999 |

(Continued)

OTHER PUBLICATIONS

Nov. 27, 2015—(US) Ex Parte Quayle—U.S. Appl. No. 14/730,829.

(Continued)

*Primary Examiner* — Madelein Nguyen
(74) *Attorney, Agent, or Firm* — Banner & Witcoff, Ltd.

(57) ABSTRACT

In an image-reading device, a reading unit reads an object. An edge image generation generates a plurality of sets of edge image data respectively corresponding to a plurality of target lines. The plurality of sets of edge image data includes a first set of edge image data corresponding to a first target line. A mask setting unit determines whether an edge pixel is included in the first set of edge image data. When the edge pixel is included in the first set of edge image data, the mask setting unit sets a mask region on the image. The mask region includes a part of the plurality of lines based on the first target line. An edge detection unit detects the edge pixel detects a positional coordinate of the edge pixel from among pixels in the plurality of sets of edge image data outside the mask region.

12 Claims, 10 Drawing Sheets

(56) References Cited

U.S. PATENT DOCUMENTS

| | | | | |
|---|---|---|---|---|
| 5,889,596 | A | * | 3/1999 | Yaguchi .................. G06T 9/004 358/448 |
| 5,917,589 | A | * | 6/1999 | Imaino .................... G01N 21/94 250/559.04 |
| 5,975,678 | A | * | 11/1999 | Kanematsu ............ B41J 2/2132 347/43 |
| 6,191,405 | B1 | | 2/2001 | Mishima et al. |
| 6,433,896 | B1 | | 8/2002 | Ueda et al. |
| 6,866,357 | B1 | * | 3/2005 | Stehle ........................ B41J 2/07 347/13 |
| 7,367,156 | B2 | * | 5/2008 | Kondo .................. B41J 2/2121 347/14 |
| 7,878,613 | B2 | * | 2/2011 | Nishikori ............. G06K 15/107 347/15 |
| 8,419,151 | B2 | * | 4/2013 | Yoshida ................ B41J 2/2132 347/15 |
| 8,427,714 | B2 | | 4/2013 | Kato et al. |
| 8,842,346 | B2 | | 9/2014 | Honda |
| 8,852,346 | B2 | * | 10/2014 | Lee ........................ C23C 14/042 118/720 |
| 8,995,022 | B1 | * | 3/2015 | Vronsky ............ H01L 21/02288 257/40 |
| 2001/0022674 | A1 | * | 9/2001 | Kelly ........................ G06K 9/32 358/488 |
| 2002/0033973 | A1 | | 3/2002 | Dolan et al. |
| 2002/0149805 | A1 | * | 10/2002 | Tanaka ............... H04N 1/00718 358/498 |
| 2002/0186390 | A1 | * | 12/2002 | Hara .................. H04N 1/00795 358/1.9 |
| 2004/0036732 | A1 | * | 2/2004 | Shoji ...................... B41J 29/393 347/19 |
| 2005/0206980 | A1 | * | 9/2005 | Nishikawa ............. B41J 29/393 358/518 |
| 2006/0176527 | A1 | * | 8/2006 | Kato ........................ G03B 1/32 358/505 |
| 2008/0080020 | A1 | * | 4/2008 | Shimasaki ......... H04N 1/32133 358/474 |
| 2009/0067014 | A1 | * | 3/2009 | Shimizu ............. H04N 1/00848 358/498 |
| 2009/0323131 | A1 | * | 12/2009 | Toyoda ................... G06T 3/608 358/448 |
| 2010/0074511 | A1 | * | 3/2010 | Tamamushi ........... B82Y 10/00 382/141 |
| 2010/0141991 | A1 | * | 6/2010 | Yoshida ............... H04N 1/3878 358/1.15 |
| 2010/0149569 | A1 | * | 6/2010 | Yoshida ............. G06K 9/00442 358/1.11 |
| 2010/0296115 | A1 | * | 11/2010 | Onishi ............... H04N 1/00005 358/1.9 |
| 2011/0026084 | A1 | | 2/2011 | Kato et al. |
| 2011/0157606 | A1 | * | 6/2011 | Kawamura .......... G06K 15/107 358/1.2 |
| 2011/0255770 | A1 | * | 10/2011 | Touya ................ G01N 21/9503 382/144 |
| 2011/0317191 | A1 | * | 12/2011 | Goda .................... G06K 15/129 358/1.13 |
| 2012/0120444 | A1 | * | 5/2012 | Hirohata ............ G06K 9/00449 358/1.15 |
| 2013/0082440 | A1 | * | 4/2013 | Fujiwara ................ B65H 3/042 271/228 |
| 2013/0083365 | A1 | * | 4/2013 | Maeda ............... H04N 1/00745 358/448 |
| 2013/0083373 | A1 | | 4/2013 | Saito |
| 2013/0194329 | A1 | * | 8/2013 | Fujimoto .................... B41J 2/07 347/9 |
| 2013/0215480 | A1 | * | 8/2013 | Iwayama ................. H04N 1/04 358/475 |
| 2014/0092419 | A1 | * | 4/2014 | Yamagishi .............. G06T 7/001 358/1.14 |
| 2015/0373218 | A1 | | 12/2015 | Watanabe |
| 2015/0373219 | A1 | * | 12/2015 | Watanabe .......... H04N 1/00748 358/488 |

FOREIGN PATENT DOCUMENTS

| | | |
|---|---|---|
| JP | 2005-005837 A | 1/2005 |
| JP | 2011-035530 A | 2/2011 |
| JP | 2013-074597 A | 4/2013 |
| JP | 2013-098720 A | 5/2013 |

OTHER PUBLICATIONS

Jan. 27, 2014—(US) Non-final Office Action—U.S. Appl. No. 13/537,961.
Aug. 13, 2014—(US) Final Office Action—U.S. Appl. No. 13/537,961.
Jan. 5, 2015—(US) Notice of Allowance—U.S. Appl. No. 13/537,961.
Apr. 28, 2015—(US) Notice of Allowance—U.S. Appl. No. 13/537,961.
Apr. 15, 2016—(US) Notice of Allowance—U.S. Appl. No. 14/730,829.
Jun. 21, 2016—(US) Non-Final Office Action—U.S. Appl. No. 14/730,829.
Aug. 3, 2016—(US) Notice of Allowance—U.S. Appl. No. 14/730,829.

* cited by examiner

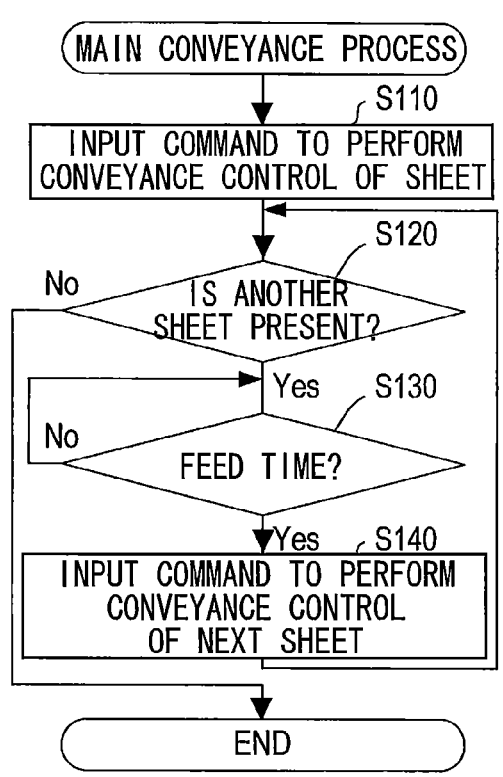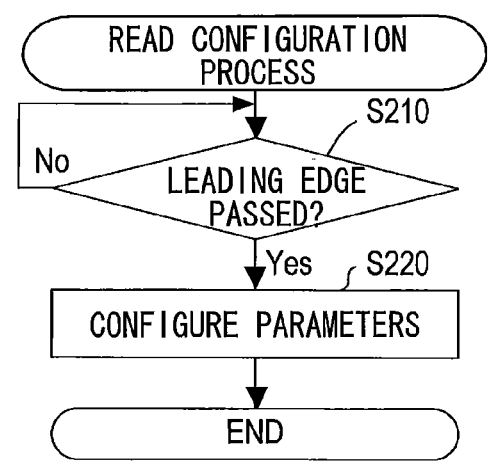
FIG. 3(A)
FIG. 3(B)

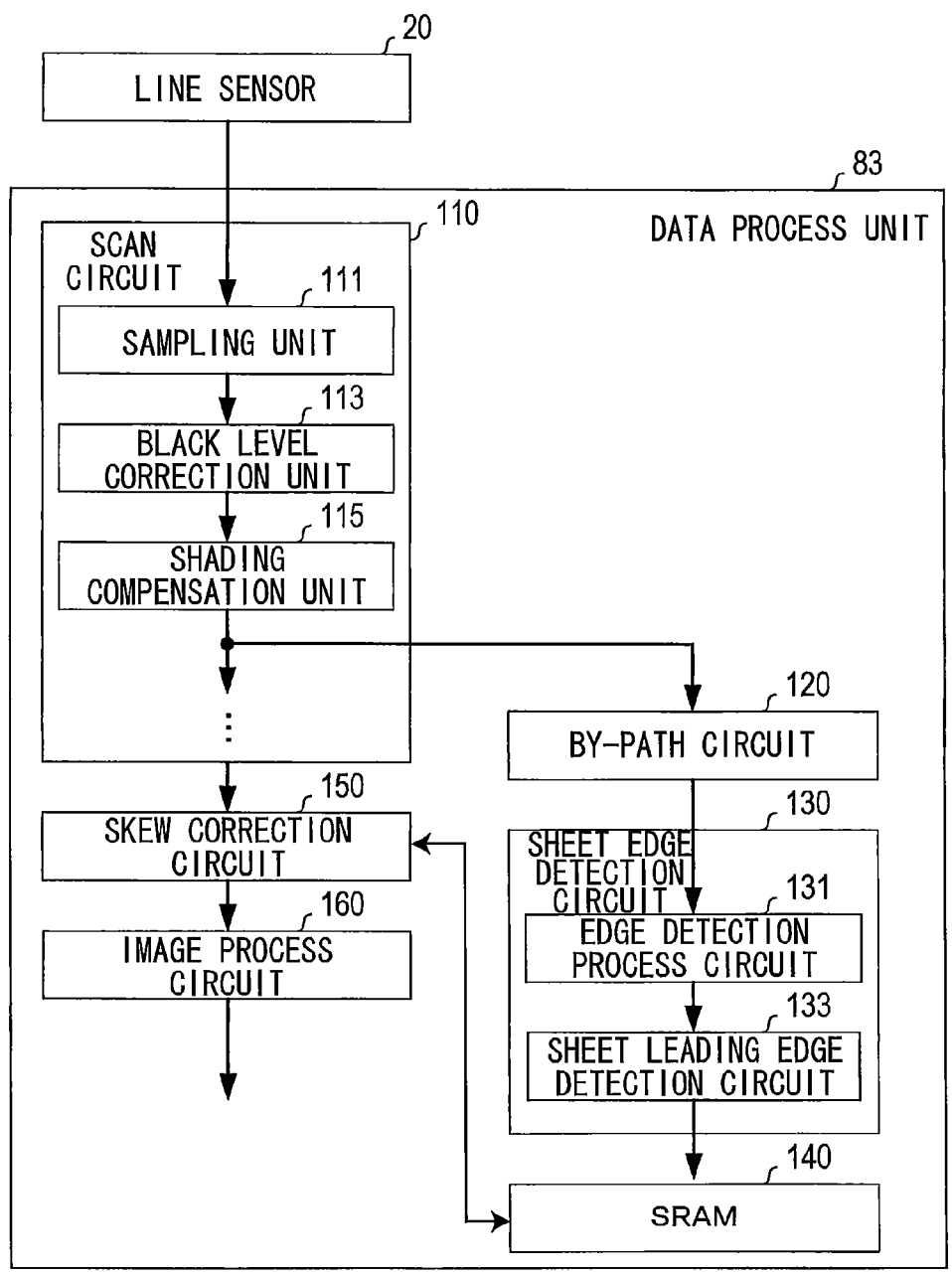

IMAGE-READING DEVICE DETECTING EDGE OF SHEET BY SETTING MASK REGION INCLUDING PART OF LINES

CROSS REFERENCE TO RELATED APPLICATION

This application claims priority from Japanese Patent Application No. 2014-125590 filed Jun. 18, 2014. The entire content of the priority application is incorporated herein by reference.

TECHNICAL FIELD

The present disclosure relates to an image-reading device.

BACKGROUND

Image-reading devices having an automatic document feeding function are known in the art. One such image-reading device performs edge detection on image data acquired by an image-reading unit when reading an original sheet, and determines whether a double-feed occurred when feeding the original sheet on the basis of the edge detection results. In order to reduce processing load, this image-reading device performs the edge detection process only in a region spanning a prescribed number of pixels from the top edge of a page worth of image data along the original sheet feeding direction.

SUMMARY

By performing an edge detection process on image data generated by the image-reading unit, the image-reading device can detect the leading edge of an original sheet. These detection results are used for estimating the size of the original sheet and correcting skew. Further one can expect that processing load related to edge detection can be reduced by limiting the region of edge detection to only part of the image data in which the leading edge of the original sheet is likely to appear.

However, when a plurality of original sheets are conveyed successively in the image-reading process, the trailing edge of the preceding sheet will be positioned close to the leading edge of the succeeding sheet. Further, there is potential for the original sheets to be conveyed with skew, i.e., to be conveyed with their sides slanted to the direction of conveyance. Such skew can lead to uncertainty over the positional relationship between the trailing edge of the preceding original sheet and the leading edge of the succeeding original sheet. Consequently, when detecting the leading edge of an original sheet on the basis of only part of the image data, the image-reading device may inadvertently detect the trailing edge of the preceding sheet to be the leading edge of the succeeding sheet.

In view of the foregoing, it is an object of the present disclosure to provide an image-reading device capable of detecting the leading edge of an original sheet with high accuracy.

In order to attain the above and other objects, the disclosure provides an image-reading device. The image-reading device includes a reading unit, a conveyance unit, a detector, a first determination unit, an edge image generation unit, a mask setting unit, and an edge detection unit. The reading unit is configured to optically read an object at a reading position, the object including a sheet. The reading unit is further configured to generate a plurality of sets of line data respectively representing a plurality of lines in an image of the object. Each of the plurality of lines has pixels arranged in a first direction. The sheet has a sheet edge. The conveyance unit is configured to convey the sheet in a second direction intersecting with the first direction. The detector is positioned upstream of the reading position in the second direction and configured to detect the sheet and output a sheet detection signal when the sheet is detected. The first determination unit is configured to determine a plurality of sets of target data from among the plurality of sets of line data in response to the sheet detection signal. The plurality of sets of target data respectively represents a plurality of target lines among the plurality of lines and being used to detect the sheet edge. The edge image generation unit is configured to generate a plurality of sets of edge image data by performing an edge detection process on the plurality of sets of target data. The plurality of sets of edge image data respectively corresponds to the plurality of target lines. The plurality of target lines has a first target line and is apposed sequentially on a line-to-line basis in the second direction from the first target line. The plurality of sets of edge image data includes a first set of edge image data and a second set of edge image data. The first set of edge image data corresponds to the first target line. The second set of edge image data corresponds to a second target line apposed next to the first target line. The mask setting unit is configured to determine whether an edge pixel is included in the first set of edge image data. The edge pixel represents at least part of the sheet edge. The mask setting unit is configured to, when the edge pixel is included in the first set of edge image data, set a mask region on the image. The mask region includes a part of the plurality of lines based on the first target line. The edge detection unit is configured to detect the edge pixel by sequentially referring to each of the plurality of sets of edge image data except the first set of edge image data according to a line order from the second target line and detect a positional coordinate of the edge pixel from among pixels in the plurality of sets of edge image data outside the mask region.

According to another aspect, the present disclosure provides an image-reading device. The image-reading device includes a reading unit, a conveyance unit, a detector, a first determination unit, an edge image generation unit, a trailing edge detection unit, a recordation unit, and a prohibiting unit. The reading unit is configured to optically read an object at a reading position. The object including a sheet. The reading unit is further configured to generate a plurality of sets of line data respectively representing a plurality of lines in an image of the object. Each of the plurality of lines has pixels arranged in a first direction. The sheet has a sheet edge. The conveyance unit is configured to convey the sheet in a second direction intersecting with the first direction. The detector is positioned upstream of the reading position in the second direction and configured to detect the sheet and output a sheet detection signal when the sheet is detected. The first determination unit is configured to determine a plurality of sets of target data from among the plurality of sets of line data in response to the sheet detection signal. The plurality of sets of target data respectively represents a plurality of target lines among the plurality of lines and being used to detect the sheet edge. The edge image generation unit is configured to generate a plurality of sets of edge image data by performing an image process on the plurality of sets of target data, the plurality of sets of edge image data respectively corresponding to the plurality of target lines. The plurality of target lines has a first target line and being apposed sequentially on a line-to-line basis in the second direction from the first target line. The plurality of sets of edge image data includes a first set of edge image data and a second set of edge image data. The first set of edge image data corresponds to the first target line. The second set of edge image data corresponds to a second target line apposed next to the first target line. The trailing edge detection unit is configured to determine whether an edge pixel representing at least part of the sheet edge is included in the first set of edge image data. The trailing edge detection unit generates a trailing edge signal when the edge pixel is included in the first set of edge image data. The recordation unit is configured to detect an edge pixel by sequentially referring to each of the plurality of sets of edge image data except the first set of edge image data according to a line order from the second target line. The recordation unit is configured to record a positional coordinate of the edge pixel, as at least part of a trailing edge of the sheet, in a storing unit when the edge pixel is detected. The prohibiting unit is configured to prohibit the recordation unit from recording a positional coordinate of an edge pixel included in a prescribed region based on the first target line when the trailing edge detection unit generates the trailing edge signal.

According to another aspect, the present disclosure provides a non-transitory computer readable storage medium storing a set of program instructions installed on and executed by a computer for controlling an image reading device. The program instructions includes: controlling a reading unit to optically read an object at a reading position, the object including a sheet, the controlling including generating a plurality of sets of line data respectively representing a plurality of lines in an image of the object, each of the plurality of lines having pixels arranged in a first direction, the sheet having a sheet edge; controlling conveyance of the sheet in a second direction intersecting with the first direction; detecting the sheet using a detector positioned upstream of the reading position in the second direction; determining a plurality of sets of target data from among the plurality of sets of line data in response to detection of the sheet, the plurality of sets of target data respectively representing a plurality of target lines among the plurality of lines and being used to detect the sheet edge; generating a plurality of sets of edge image data by performing an edge detection process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line; determining whether an edge pixel is included in the first set of edge image data, the edge pixel representing at least part of the sheet edge; setting, when the edge pixel is included in the first set of edge image data, a mask region on the image. The mask region includes the part of the plurality of lines based on the first target line; detecting the edge pixel by sequentially referring to each of the plurality of sets of edge image data except the first set of edge image data according to a line order from the second target line; and detecting a positional coordinate of the edge pixel from among pixels in the plurality of sets of edge image data outside the mask region.

According to another aspect, the present disclosure provides a non-transitory computer readable storage medium storing a set of program instructions installed on and executed by a computer for controlling an image reading device. The program instructions includes: controlling a reading unit to optically read an object at a reading position, the object including a sheet, the controlling including generating a plurality of sets of line data respectively representing a plurality of lines in an image of the object, each of the plurality of lines having pixels arranged in a first direction, the sheet having a sheet edge; controlling conveyance of the sheet in a second direction intersecting with the first direction; detecting the sheet using a detector positioned upstream of the reading position in the second direction; determining a plurality of sets of target data from among the plurality of sets of line data in response to detection of the sheet, the plurality of sets of target data respectively representing a plurality of target lines among the plurality of lines and being used to detect the sheet edge; generating a plurality of sets of edge image data by performing an image process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line; determining whether an edge pixel representing at least part of the sheet edge is included in the first set of edge image data; generating a trailing edge signal when the edge pixel is included in the first set of edge image data; detecting an edge pixel by sequentially referring to each of the plurality of sets of edge image data except the first set of edge image data according to a line order from the second target line; recording a positional coordinate of the edge pixel, as at least part of a trailing edge of the sheet, in a storing unit when the edge pixel is detected; and prohibiting the recording from recording positional a coordinate of an edge pixel included in a prescribed region based on the first target line when the trailing edge signal is generated.

BRIEF DESCRIPTION OF THE DRAWINGS

The particular features and advantages of the disclosure as well as other objects will become apparent from the following description taken in connection with the accompanying drawings, in which:

FIG. 3(A) is a flowchart illustrating a main conveyance process performed by a main unit according to the embodiment;

FIG. 3(B) is a flowchart illustrating a read configuration process performed by the main unit according to the embodiment;

FIG. 4 is a block diagram illustrating a configuration of a data process unit according to the embodiment;

DETAILED DESCRIPTION

Figure 1:
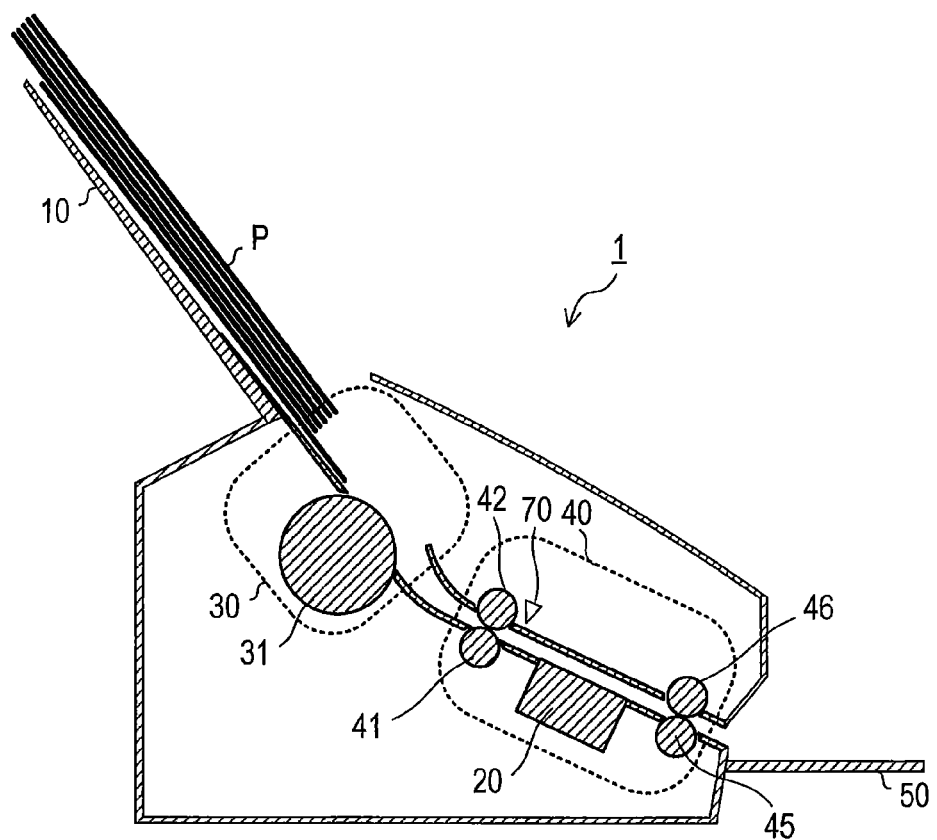
FIG. 1 is an overview cross section illustrating an image-reading device according to an embodiment.

FIG. 1 shows an image-reading device 1 according to an embodiment of the present disclosure. The image-reading device 1 of the embodiment is a document scanner. The image-reading device 1 includes a sheet tray 10, a line sensor 20, a separating mechanism 30, a conveying mechanism 40, and a discharge tray 50.

The sheet tray 10 holds sheets P of an original sheet to be read. The separating mechanism 30 is provided at the bottom end of the sheet tray 10 and, together with the conveying mechanism 40, is a mechanism for conveying the sheets P. The separating mechanism 30 includes a separating roller 31.

The separating roller 31 is disposed in a position for contacting the sheets P loaded in the sheet tray 10. By rotating, the separating roller 31 separates the bottommost sheet P in direct contact with the separating roller 31 from the rest of the sheets P stacked in the sheet tray 10, and conveys this bottommost sheet P downstream toward the conveying mechanism 40. Note that the separating mechanism 30 is not limited to the separating roller 31, but may be provided with any well-known structure for suitably separating sheets P one at a time.

The conveying mechanism 40 is disposed downstream of the separating mechanism 30 in the conveying direction. The conveying mechanism 40 includes a first pair of rollers configured of a conveying roller 41, and a follow roller 42; and a second pair of rollers configured of a discharging roller 45, and a follow roller 46. These pairs of rollers are disposed along the conveying path of the sheets P and rotate to convey sheets P downstream in the conveying direction. While an original sheet P is pinched between the conveying roller 41 and the follow roller 42 and/or between the discharging roller 45 and the follow roller 46, the conveying roller 41 and/or the discharging roller 45 rotate to convey the sheet P into the discharge tray 50.

The line sensor 20 includes a well-known contact image sensor (CIS). The line sensor 20 is disposed along the conveying path of the sheets P between the conveying roller 41 and the discharging roller 45. Under control of an application-specific integrated circuit (ASIC) 80 (see FIG. 2), the line sensor 20 optically reads the sheet P in a main scanning direction and generates a set of line image data that includes one line worth of pixel values along the main scanning direction representing the scanned image. The main scanning direction used in this description is the axial direction of the conveying roller 41 and corresponds to the normal direction to the drawing in FIG. 1. A sub scanning direction is defined as a direction orthogonal to the main scanning direction that corresponds to the conveying direction of the sheets P. In the embodiment, the terms "upstream" and "downstream" are used in reference to the conveyance of sheets P, with the downstream direction indicating the conveying direction from the sheet tray 10 to the discharge tray 50.

The image-reading device 1 having this configuration performs an image-reading process in response to a request from an external device 5 (see FIG. 2) and provides image data representing the image read from the sheet P to the external device 5. Specifically, the separating mechanism 30 conveys original sheets P one at a time from the sheet tray 10 toward a reading position of the line sensor 20. The line sensor 20 reads images on the sheets P as the conveying mechanism 40 conveys the sheets P into the discharge tray 50.

Figure 2:
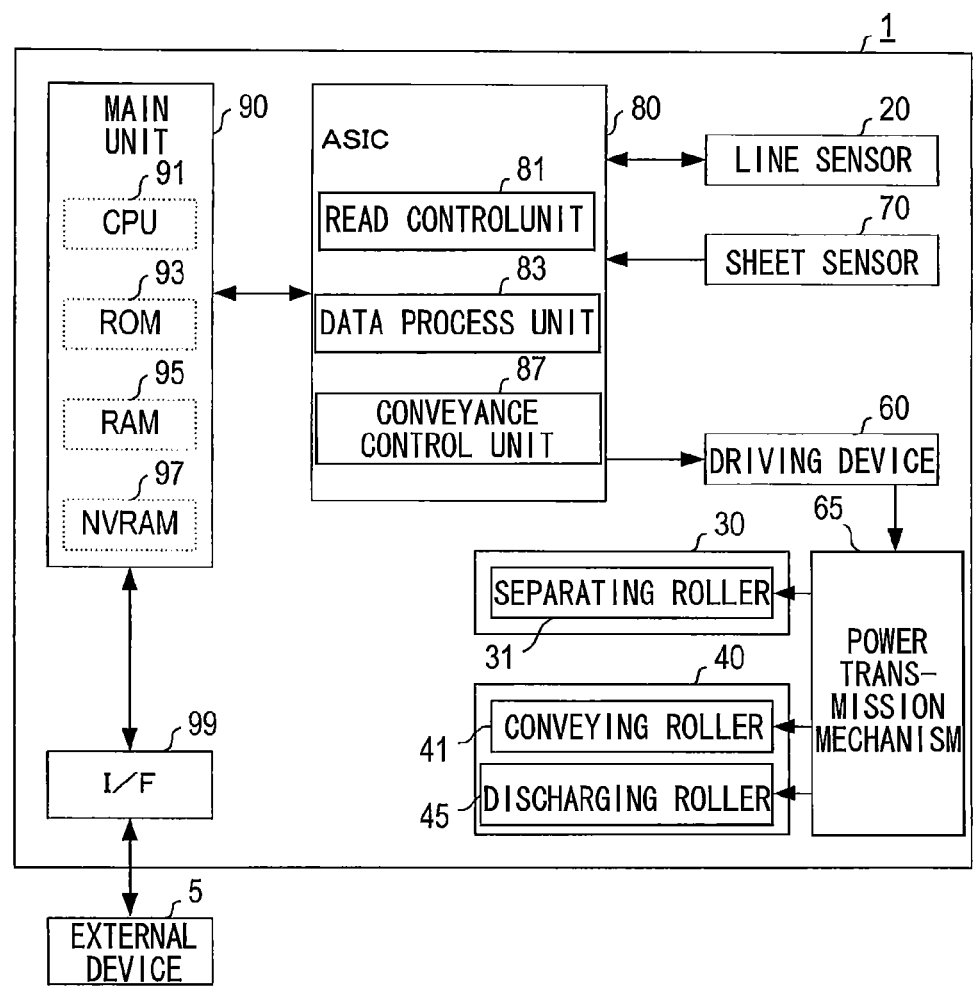
FIG. 2 is a block diagram illustrating an electrical structure of the image-reading device according to the embodiment.

As shown in FIG. 2, the image-reading device 1 includes a driving device 60, a power transmission mechanism 65, a sheet sensor 70, an ASIC 80, a main unit 90, and a communication interface 99, in addition to the line sensor 20, the separating mechanism 30, and the conveying mechanism 40 described above.

The driving device 60 drives the separating roller 31, the conveying roller 41, and the discharging roller 45 to rotate using the power transmission mechanism 65. In other words, the power transmission mechanism 65 transmits power supplied from the driving device 60 to the separating roller 31, the conveying roller 41, and the discharging roller 45.

The driving device 60 is provided with one or more electric motors. For example, the driving device 60 may include a separate motor for each of the separating roller 31, the conveying roller 41, and the discharging roller 45. Alternatively, the driving device 60 may be provided with a single motor that is shared among the separating roller 31, the conveying roller 41, and the discharging roller 45. As another example, the driving device 60 may include one motor for driving the separating roller 31 to rotate, and another motor for driving the conveying roller 41 and the discharging roller 45 to rotate.

The separating roller 31, the conveying roller 41, and the discharging roller 45 receive power from the driving device 60 via the power transmission mechanism 65 and rotate, either independently from or in association with each other. When the electric motor or electric motors provided in the driving device 60 are DC motors, the driving device 60 may also be provided with one or more rotary encoders for detecting rotational amounts of the separating roller 31, the conveying roller 41, and the discharging roller 45. The output signal from each rotary encoder is inputted into the ASIC 80 as an angular position signal. The angular position signal is used by the ASIC 80 to identify the rotational amounts of the separating roller 31, the conveying roller 41, and the discharging roller 45.

The sheet sensor 70 is provided along the conveying path of the sheet P upstream of the line sensor 20. When a sheet P is present at the position of the sheet sensor 70 on the conveying path, the sheet sensor 70 inputs a detection signal into the ASIC 80 indicating that a sheet P is present. This detection signal is used by the ASIC 80 to identify the position in the sub scanning direction of a sheet P approaching the reading position.

The sheet sensor 70 detects a specific point of a sheet P in the main scanning direction and does not detect the entire range of the sheet P in the main scanning direction. For example, the sheet sensor 70 is located at the center point in the main scanning direction of the path along which the sheet P is conveyed and detects the sheet P at the center part. In this case, the image-reading device 1 can be configured to convey sheets P so that the center of the sheets P passes through the center point of the conveying path in the main scanning direction.

The ASIC 80 includes a read control unit 81, a data process unit 83, and a conveyance control unit 87. The read control unit 81 controls the reading operation of the line sensor 20 in response to commands from the main unit 90 so that the line sensor 20 generates a set of line image data representing one line of the original sheet each time the sheet P is conveyed the width of one line in the sub scanning direction.

The data process unit 83 digitally samples the analog signal inputted from the line sensor 20 to convert the analog line image data (the analog signal) to a set of digital line image data. The data process unit 83 performs various processes on this set of digital line image data, such as black level correction, shading compensation, and sheet skew correction. The configuration of the data process unit 83 will be described later in greater detail. In addition to the correction processes mentioned above, the data process unit 83 produces scanned image data for the sheet P from the sets of line image data generated by the line sensor 20 and supplies this data to the main unit 90.

The sheet sensor 70 controls rotations of the separating roller 31, the conveying roller 41, and the discharging roller 45 by controlling the driving device 60. When the driving device 60 has a DC motor, the conveyance control unit 87 controls the rotations of the separating roller 31, the conveying roller 41, and the discharging roller 45 through feedback based on the angular position signal received from the driving device 60. For example, while the line sensor 20 reads a sheet P, the conveyance control unit 87 receives feedback from the driving device 60 and controls the rotational amounts and speeds of the conveying roller 41 and the discharging roller 45 so that the sheet P is conveyed at a constant speed.

The main unit 90 includes a CPU 91, a ROM 93, a RAM 95, and an NVRAM 97. The CPU 91 executes processes based on programs stored on the ROM 93. The RAM 95 is used as a work area when the CPU 91 executes these processes. The NVRAM 97 is a nonvolatile memory that can be electrically overwritten with data for storing various types of data. By executing various processes with the CPU 91, the main unit 90 controls the overall operations of the image-reading device 1 and implements the necessary functions of the image-reading device 1.

The main unit 90 communicates with the external device 5, for example, via the communication interface 99. When a read request is received from the external device 5, the main unit 90 inputs a command into the ASIC 80 to execute a reading operation for a sheet P in response to this request.

The main unit 90 provides image data to the external device 5 via the communication interface 99 representing a scanned image of the sheet P generated through the reading operation. The external device 5 is a personal computer, for example. A user performs operations on the external device 5 to input a read request to the image-reading device 1.

More specifically, upon receiving a read request from the external device 5 via the communication interface 99, the main unit 90 executes a main conveyance control process shown in FIG. 3(A) and a read configuration process shown in FIG. 3(B).

As shown in FIG. 3(A), in S110 at the beginning of the main conveyance control process, the main unit 90 inputs a command into the ASIC 80 to perform conveyance control on one sheet P from feed to discharge. Upon receiving this command, the conveyance control unit 87 of the ASIC 80 controls the driving device 60 for driving the separating mechanism 30 to separate one sheet P from the sheet tray 10 and to supply this sheet P to the nipping position between the conveying roller 41 and the follow roller 42. The conveyance control unit 87 also controls the driving device 60 to control the conveying mechanism 40 to execute a conveying operation to convey the sheet P from the nipping position to the discharge tray 50.

After inputting this command, in S120 the main unit 90 determines whether another sheet P is present in the sheet tray 10. If another sheet P is present (S120: YES), in S130 the main unit 90 waits until the feed timing for the next sheet P comes. While not shown in the drawings, the image-reading device 1 is also provided with a sensor for detecting when a sheet P is loaded in the sheet tray 10. When the feed timing for the next sheet P comes (S130: YES), in S140 the main unit 90 inputs a command into the ASIC 80 to perform conveyance control for controlling the next sheet P from feed to discharge.

Figure 5A:
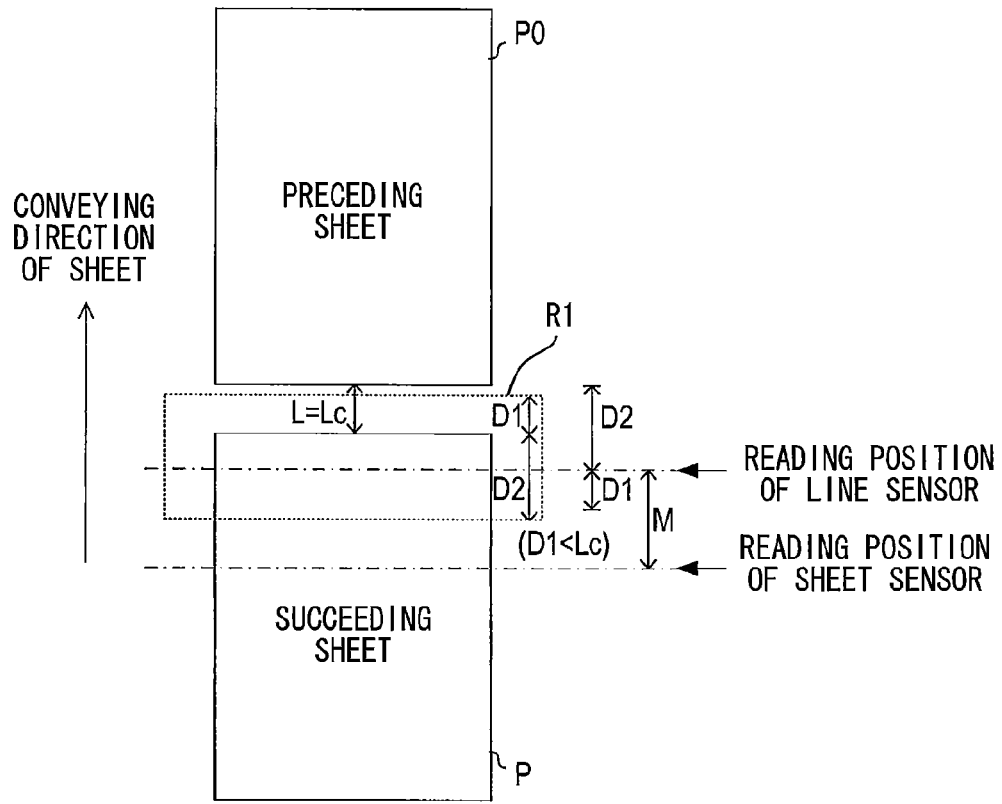
FIG. 5(A) is an explanatory diagram illustrating a positional relation between an original sheet and a sheet edge detection region when the original sheet is not skewed.

For example, in S140 the main unit 90 may input the command described above into the ASIC 80 at a timing after the rotation of the separating roller 31 has conveyed the next sheet P to the nipping position between the conveying roller 41 and the follow roller 42 so that a conveying gap L between this sheet P and the preceding sheet P0 (see FIG. 5(A)) becomes a predetermined fixed gap Lc.

At this time, the separating roller 31 may be rotated at the same speed as the conveying roller 41 or at a slower speed than the conveying roller 41. When the rotational speed of the separating roller 31 is slower than that of the conveying roller 41, the gap between the preceding sheet P0 and the succeeding sheet P grows due to this speed differential while the succeeding sheet P is being conveyed toward the nipping position between the conveying roller 41 and the follow roller 42.

Thus, by setting a suitable speed differential in advance, the main unit 90 can input the command into the ASIC 80 in S140 at the same time the trailing edge of the preceding sheet P0 leaves the separating roller 31. Owing to the suitable setting of the speed differential, the separating mechanism 30 can begin conveying the succeeding sheet P at the point in time that the succeeding sheet P arrives at the nipping position between the conveying roller 41 and the follow roller 42 so that the conveying gap L between the preceding sheet P0 and the succeeding sheet P is equivalent to the fixed gap Lc.

After the succeeding sheet P arrives at the nipping position between the conveying roller 41 and the follow roller 42, the conveying mechanism 40 begins conveying the sheet P downstream together with the preceding sheet P0. Thus, the succeeding sheet P can be conveyed such that its conveying gap L with the preceding sheet P0 is at the fixed gap Lc, at any position on the conveying path between the conveying roller 41 and the discharging roller 45.

In the embodiment, the separating roller 31 is arranged on the conveying path of the sheet P with reference to the center point of the conveying path in the main scanning direction so that a prescribed length of the separating roller 31 is positioned on both sides of the center point, that is, the center point of the separating roller 31 in the main scanning direction coincides with the center position of the conveying path of the sheet P in the main scanning direction. The conveying gap L can be maintained approximately at the fixed gap Lc along a line (a reference line C shown in FIG. 7(B) extending in (parallel to) the sub scanning direction through the center point of the separating roller 31 in the main scanning direction.

As a separate example, the main unit 90 may detect when the trailing edge of the preceding sheet P0 passes the detection position of the sheet sensor 70 on the basis of a signal inputted from the ASIC 80, and may uses this detection as the condition for reaching a YES determination in S130 to advance to S140. In S140 the main unit 90 may then input a command into the ASIC 80 so that the separating mechanism 30 supplies the next sheet P to the nipping position between the conveying roller 41 and the follow roller 42.

In this example, the succeeding sheet P is conveyed quickly to the nipping position of the conveying roller 41. Subsequently, the conveying mechanism 40 conveys the succeeding sheet P downstream together with the preceding sheet P0 so that the sheet P follows the preceding sheet P0. Through these operations of the separating mechanism 30 and the conveying mechanism 40, the succeeding sheet P is conveyed so that the conveying gap L from the preceding sheet P0 is maintained at the fixed gap Lc along the conveying path between the conveying roller 41 and the discharging roller 45. In other words, the conveying gap L is maintained at the fixed gap Lc measured along a straight line that extends in the sub scanning direction and passes the center point of the separating roller 31 (or the center point of the conveying path) in the main scanning direction at which the sheet sensor 70 detects the sheets P.

If the driving device 60 and the power transmission mechanism 65 are capable of driving the discharging roller 45 to rotate while maintaining the conveying roller 41 in a halted state, then in S140 the main unit 90 may input a command into the ASIC 80 after the trailing edge of the preceding sheet P0 has passed the nipping position between the conveying roller 41 and the follow roller 42 so that the ASIC 80 controls the separating mechanism 30 to execute a feeding operation on the succeeding sheet P while the conveying roller 41 is halted. This feeding operation can correct skew in the succeeding sheet P at the nipping position.

In this case, the conveyance control unit 87 performs conveyance control to begin driving the conveying roller 41 to rotate after the succeeding sheet P has arrived at the nipping position between the conveying roller 41 and the follow roller 42 so that the succeeding sheet P is conveyed from the nipping position at a timing in which the conveying gap L from the succeeding sheet P to the preceding sheet P0 has reached the fixed gap Lc. The main unit 90 can determine this timing on the basis of the distance between the nipping position and the trailing edge of the preceding sheet P0. This distance can be identified from the detection results of the sheet sensor 70 and the conveyance amount of the preceding sheet P0. The conveyance amount can be identified on the basis of an operating amount of the driving device 60 or an angular position signal received from the driving device 60.

After completing the process in S140 described above, the main unit 90 returns to S120. When the main unit 90 determines that another sheet P is not present in the sheet tray 10 (S120: NO), the main unit 90 ends the current main conveyance control process.

Next, the read configuration process executed by the main unit 90 will be described. Upon receiving a read request from the external device 5, the main unit 90 executes the read configuration process shown in FIG. 3(B) each time a sheet P is supplied downstream from the sheet tray 10 on the basis of the request (or the command).

In S210 at the beginning of the read configuration process, the main unit 90 waits until the main unit 90 detects that leading edge of a sheet P has passed the detection point of the sheet sensor 70 on the basis of an input signal from the ASIC 80.

When the main unit 90 detects that leading edge of the sheet P has passed the detection point of the sheet sensor 70 (S210: YES), in S220 the main unit 90 configures parameters in the ASIC 80 that define the operations for the read control unit 81 and the data process unit 83 in relation to the sheet P whose leading edge passing the detection point was just detected. For example, as described later in detail, the parameters in the ASIC 80 includes parameters specifying a sheet edge detection region R1, a determination threshold H, a position of the reference line C (pixel count value), a line count value corresponding to a starting line of the sheet edge detection region R1, a length W in the sub scanning direction of a mask region MR, ON/OFF data for a mask function, a values ("0") of a writing complete flags, initial values Yn as sub scanning positions Y. Further, the main unit 90 inputs a command into the ASIC 80 to implement the reading operations of the line sensor 20 and the data processing operations of the data process unit 83 on the basis of the parameters. Subsequently, the main unit 90 ends the current read configuration process.

Next, the structure of the data process unit 83 will be described in greater detail. As shown in FIG. 4, the data process unit 83 includes a scan circuit 110, a by-path circuit 120, a sheet edge detection circuit 130, a static RAM (SRAM) 140, a skew correction circuit 150, and an image process circuit 160.

The scan circuit 110 further includes a sampling unit 111, a black level correction unit 113, and a shading compensation unit 115. The sampling unit 111 converts line image data inputted from the line sensor 20 as an analog signal into a set of digital line image data. The black level correction unit 113 corrects the black level of the set of line image data acquired from the sampling unit 111 on the basis of black reference data in order to suppress variations in brightness among pixels. The shading compensation unit 115 performs shading compensation on the set of line image data acquired from the black level correction unit 113 on the basis of white reference data.

Set of line image data produced from shading compensation by the shading compensation unit 115 undergoes any further required processes in the scan circuit 110 before being inputted into the skew correction circuit 150. Additionally, the set of line image data produced by the shading compensation unit 115 is inputted directly into the by-path circuit 120.

The by-path circuit 120 performs processes such as resolution conversion on the set of line image data outputted from the scan circuit 110 as preprocesses to an edge detection process.

The sheet edge detection circuit 130 includes an edge detection process circuit 131, and a sheet leading edge detection circuit 133.

The edge detection process circuit 131 executes an edge detection process on each set of line image data inputted from the by-path circuit 120. One edge detection process known in the art employs a differentiation filter. The edge detection process circuit 131 generates a set of edge image data emphasizing the edges of the original sheet for each line worth of line image data (each set of line image data) by applying the differentiation filter to the sets of line image data inputted from the by-path circuit 120. The set of edge image data corresponds to one line. The edge detection process circuit 131 performs thresholding on the edge image data and sequentially inputs the resulting binary edge image data into the sheet leading edge detection circuit 133.

The sheet leading edge detection circuit 133 stores position coordinates (or data indicating the position coordinates) for the leading edge of a sheet P in the SRAM 140 on the basis of the binary edge image data inputted from the edge detection process circuit 131. The position coordinates (or data indicating the position coordinates) stored in the SRAM 140 are supplied to the skew correction circuit 150 and used to correct skew. The main unit 90 may also use the position coordinates to detect the size of the sheet P and the skew angle of the sheet P. Further, the skew angle of the sheet P may be supplied to the skew correction circuit 150 from the main unit 90. Alternatively, the sheet leading edge detection circuit 133 may detect the skew angle of the sheet P and supplies data of the skew angle of the sheet P to the skew correction circuit 150.

The skew correction circuit 150 performs skew correction on the set of line image data inputted from the scan circuit 110 on the basis of data indicating the position coordinates or data indicating the skew angle of the sheet P. In other words, the skew correction circuit 150 performs rotational correction on the set of line image data according to the skew angle of the sheet P.

The set of line image data resulting from skew correction performed by the skew correction circuit 150 is inputted into the image process circuit 160 to be subjected to other image processing and is subsequently provided to the main unit 90 as scanned image data for the sheet P. The main unit 90 stores the scanned image data in the RAM 95 or the NVRAM 97. One of the image processes performed by the image process circuit 160 may be an image compression process for producing a compressed file as the scanned image data of the sheet P. The method of image compression may be the JPEG compression method or another method known in the art.

Next, an overview of the functions and operations of the sheet leading edge detection circuit 133 will be described with reference to FIGS. 5(A), 5(B), 6(A), 6(B), 6(C), 6(D), 7(A), and 7(B). FIG. 5(A) shows the positional relationship of a preceding sheet P0 and a succeeding sheet P for a case in which the sheets P0 and P are conveyed normally downstream in the sub scanning direction without skew. The box formed by dotted lines in FIG. 5(A) denotes a sheet edge detection region R1. In the normal state, the conveying gap L between the preceding sheet P0 and the succeeding sheet P is the fixed gap Lc described above.

The sheet leading edge detection circuit 133 detects position coordinates for the leading edge of a sheet P on the basis of the sets of edge image data within the preset sheet edge detection region R1 from among sets of inputted edge image data that are inputted from the edge detection process circuit 131 on one line basis.

In S220 of FIG. 3(B) described above, the main unit 90 sets the sheet edge detection region R1 for the sheet leading edge detection circuit 133. The main unit 90 initializes the edge detection process circuit 131 and the sheet leading edge detection circuit 133 in S220 and configures parameters for the sheet leading edge detection circuit 133 specifying the starting line and the ending line of the sheet edge detection region R1 as the parameters defining the sheet edge detection region R1.

This initialization in S220 triggers the edge detection process circuit 131 to start a process for generating edge image data for each line. The edge detection process circuit 131 inputs the sets of generated edge image data line-by-line into the sheet leading edge detection circuit 133.

The sheet leading edge detection circuit 133 updates a line count value each time the set of edge image data is inputted from the edge detection process circuit 131, beginning from the point in time at which the leading edge of the sheet P passes the detection position of the sheet sensor 70. This line count value is roughly proportional to the conveyance amount of the sheet P in the sub scanning direction from the point in time at which the leading edge of the sheet P passes the detection position of the sheet sensor 70. Hereinafter, the point at which the sheet sensor 70 detects the leading edge of the sheet P (the center point of the leading edge, for example) will be called the reference point of the sheet P.

The starting line and the ending line positions of the sheet edge detection region R1 described above are set as line count values. In the example of FIG. 5(A), edge image data for the starting line of the sheet edge detection region R1 corresponds to the set of line image data that the line sensor 20 generates in a reading operation when the reference point of the sheet P is in a position upstream from the read position of the line sensor 20 by a distance D1 in the sub scanning direction. Further, the edge image data for the ending line corresponds to a set of line image data that the line sensor 20 generates in a reading operation when the reference point of the sheet P is at a position downstream from the read position of the line sensor 20 by a distance D2 in the sub scanning direction.

If M denotes the distance in the sub scanning direction from the detection position of the sheet sensor 70 to the read position of the line sensor 20, then the position of the starting line for the sheet edge detection region R1 is set to the line count value corresponding to the distance M−D1 and the position of the ending line for the sheet edge detection region R1 is set to the line count value corresponding to the distance M+D2.

The sheet edge detection region R1 is configured so that the distance D1 is shorter than the fixed gap Lc. Accordingly, the trailing edge of the preceding sheet P0 will not appear in the sets of edge image data for the sheet edge detection region R1 when the sheets P0 and P are conveyed normally with no skew. The distance D1 is set so that the entire leading edge of the sheet P whose leading edge position is subject for detection is contained in the sheet edge detection region R1, even when the sheet P is skewed. Thus, the sheet leading edge detection circuit 133 can detect the position coordinates for the leading edge of the sheet P with accuracy on the basis of the sets of edge image data corresponding to an edge in the sheet edge detection region R1.

Figure 5B:
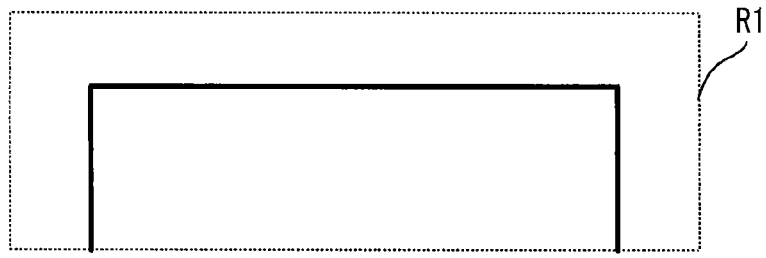
FIG. 5(B) is an explanatory diagram illustrating an edge image (a bold line) of the original sheet in the sheet edge detection region when the original sheet is not skewed.

FIG. 5(B) conceptually illustrates an edge image represented by the sets of edge image data when there is no skew in the sheets P0 and P and the sheet edge detection region R1 is configured as described above. As in FIG. 5(A), the dotted line in FIG. 5(B) represents the sheet edge detection region R1, while the bold line represents the edge of the sheet P that appears within the set of edge image data. The sheet edge detection region R1 in FIG. 5(B) is depicted larger than that in FIG. 5(A).

In the set of edge image data, pixel values corresponding to the edge of an original sheet (the bold line) have pixel value "1", while all other pixels in the region have pixel value "0", for example. Hereinafter, pixels in the set of edge image data having the value "1" will be called "edge points."

Figure 6:
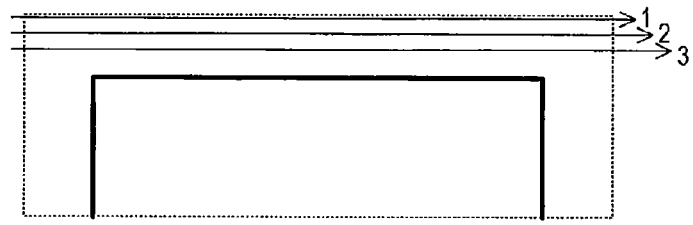
FIG. 6(A) is an explanatory diagram illustrating an order in which a plurality of sets of edge image data is referred by a leading edge detection circuit according to the embodiment.
FIG. 6(B) is an explanatory diagram illustrating an edge of the original sheet using an XY coordinate system.
FIG. 6(C) is an explanatory diagram illustrating points (bold lines) in the sheet edge detection region corresponding to positions in an SRAM.
FIG. 6(D) is an explanatory diagram illustrating an area of the SRAM for recording a pixel position of the edge of the original sheet in a sub scanning direction for each pixel position in a main scanning direction.
Figure 6:
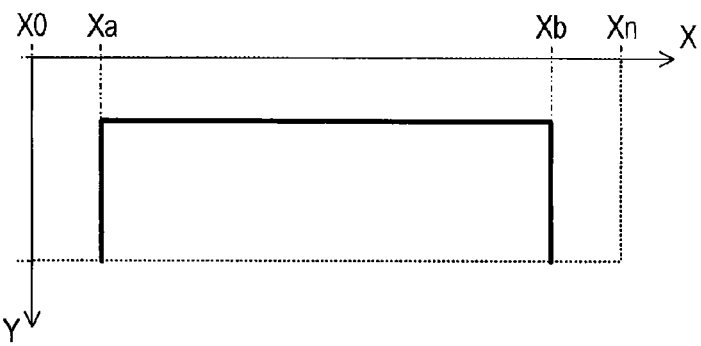
Figure 6:
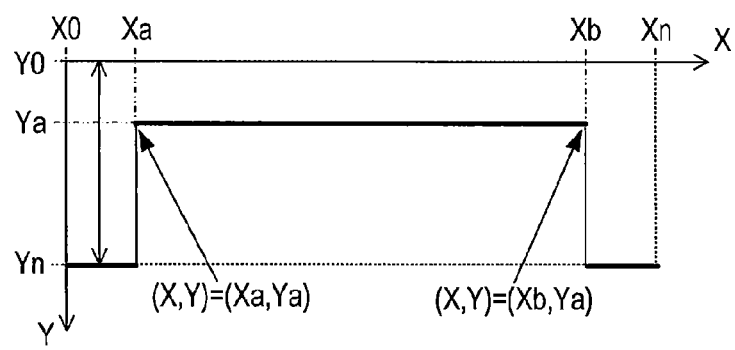
Figure 6:
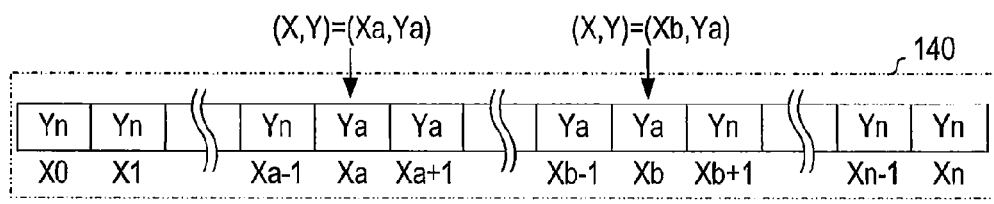

As shown in FIG. 6(A), the sheet leading edge detection circuit 133 references the set of edge image data in the sheet edge detection region R1 corresponding to one line at a time in order of smallest to largest line number (line count value) beginning from a set of edge image data corresponding to the top line. For a pixel position in the main scanning direction, the sheet leading edge detection circuit 133 writes the position in the sub scanning direction (line count value) corresponding to a firstly found pixel representing an edge of an original sheet to the SRAM 140 among pixels at the pixel position in the main scanning direction. The leading edge detection circuit 133 performs this writing operation for each of pixel position in the main scanning direction.

As shown in FIG. 6(D), an area in the SRAM 140 is pre-allocated for recording the position of the leading edge of the sheet P in the sub scanning direction for each pixel position in the main scanning direction. By writing these positions in the sub scanning direction (line count values) for pixels representing the edge of the original sheet to the corresponding areas in the SRAM 140 in association with the pixel positions in the main scanning direction, the sheet leading edge detection circuit 133 records the position coordinates for the leading edge of the sheet P in the SRAM 140.

In the sheet edge detection region R1 (sets of edge image data) according to the example of FIG. 6(B), the leading edge of the sheet P does not appear in the region from X0 to Xa for pixel positions X in the main scanning direction (hereinafter called "main scanning positions X") and the region from Xb to Xn, but the leading edge of the sheet P does appear in the region from Xa to Xb in the main scanning direction.

The sheet leading edge detection circuit 133 records the pixel position Y in the sub scanning direction (hereinafter called the "sub scanning position Y") in association with each main scanning position X for points represented by the bold line in FIG. 6(C) to record the position coordinates for the leading edge of the sheet P. Thus, the sub scanning position Ya is recorded for each main scanning position X in the areas of the SRAM 140 corresponding to the range of main scanning positions X from Xa to Xb.

The leading edge of the sheet P does not appear in the range of main scanning positions X from X0 to Xa and the range of main scanning positions from Xb to Xn. The last line position Yn of the sheet edge detection region R1 is stored for each of the main scanning positions in these ranges of main scanning positions X (the range from X0 to Xa and the range from Xb to Xn) of the SRAM 140.

More specifically, when initializing sub scanning positions Y in the SRAM 140, all sub scanning positions Y are initialized to the last line position Yn. This initial sub scanning positions Yn is maintained for each main scanning position X at which the leading edge of the sheet P does not appear. Accordingly, the last line position Yn of the sheet edge detection region R1 is stored for each of the main scanning positions in these ranges of main scanning positions X, as described above. In the embodiment, positions in the main scanning direction whose storing areas in the SRAM 140 stores a last line position Yn are considered positions in which the leading edge of the sheet P does not appear.

Figure 7A:
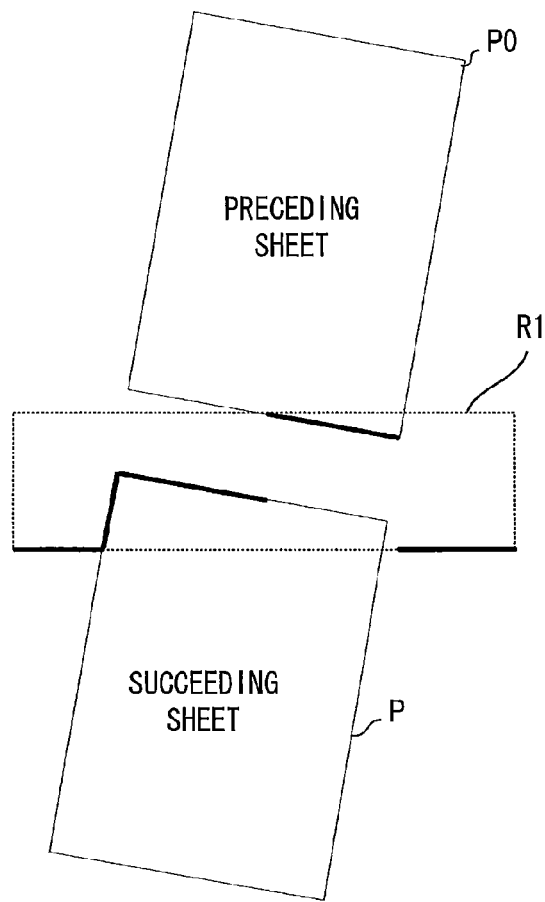
FIG. 7(A) is an explanatory diagram illustrating a positional relation between an original sheet and a sheet edge detection region when the original sheet is skewed.

In some cases, as illustrated in FIG. 7(A), the trailing edge of the preceding sheet P0 may appear in the sets of edge image data in the sheet edge detection region R1 when the preceding sheet P0 is skewed. In such cases, when position coordinates are recorded in the SRAM 140 for pixels representing the leading edge of the sheet P according to the methods described above, coordinates for the region depicted by a bold line in FIG. 7(A) are recorded as the position coordinates for the leading edge of the sheet P. That is, position coordinates for the trailing edge of the sheet P are mistakenly recorded in the SRAM 140 as the leading edge of the targeted sheet P.

Figure 7B:
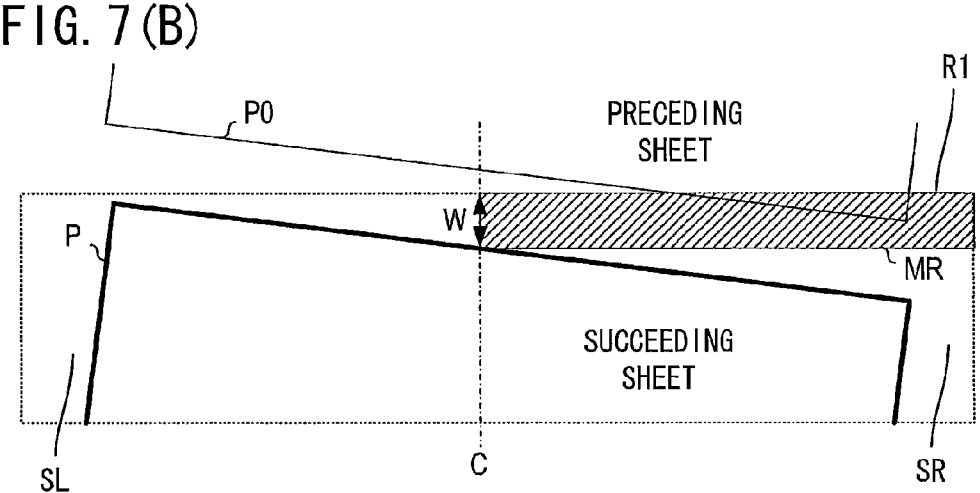
FIG. 7(B) is an explanatory diagram illustrating a mask region in the sheet edge detection region.

In order to prevent position coordinates for the trailing edge of the sheet P from being mistakenly recorded in the SRAM 140, when the sheet leading edge detection circuit 133 detects pixels representing the edge of an original sheet in a set of edge image data for the top line of the sheet edge detection region R1 in the embodiment, as illustrated in FIG. 7(B), the sheet leading edge detection circuit 133 defines a prescribed region of the sheet edge detection region R1 beginning from the top line as a mask region MR. The mask region MR corresponds to the shaded region in FIG. 7(B).

Here, the sheet leading edge detection circuit 133 references each pixel, line by line, in the sets of edge image data for the sheet edge detection region R1 and records, in the SRAM 140, the sub scanning position Y for each pixel representing the edge of an original sheet that appears at any main scanning position X. However, when the edge of an original sheet is detected within the mask region MR, the sheet leading edge detection circuit 133 does not record the sub scanning position Y in the SRAM 140 for that pixel.

In other words, when referring to pixels in order of lines in the sub scanning direction, the sheet leading edge detection circuit 133 performs an operation to record the sub scanning position Y in the SRAM 140 for the firstly found pixel that represents an edge outside the mask region MR from among pixels at a main scanning position X. The leading edge detection circuit 133 performs this operation to record the sub scanning position Y for each main scanning position X if an pixel at the corresponding main scanning position X representing an edge outside the mask region MR is firstly found from among pixels in the main scanning position X. By configuring the sheet leading edge detection circuit 133 in the embodiment to set the mask region MR and to perform these operations, the sheet leading edge detection circuit 133 can prevent position coordinates for the trailing edge of the preceding sheet P0 from being recorded in the SRAM 140.

The mask region MR extends from the top line in a length W in the sub scanning direction. The length W is set so that the trailing edge of the preceding sheet P0 will not appear outside the mask region MR, even when the sheet P is skewed at the maximum angle anticipated. The length W in the sub scanning direction is set under the assumption that the conveying gap L between the succeeding sheet P and the preceding sheet P0 is controlled at the fixed gap Lc along the reference line C. The reference line C is defined as a line extending in and parallel to the sub scanning direction that passes through the location in which the conveying gap L is maintained at the fixed gap Lc. The position at which the conveying gap L is maintained at the fixed gap Lc corresponds to the center point on the conveying path of the sheet P in the main scanning direction, for example.

More specifically, the length W of the mask region MR is set to a value calculated by adding a certain amount of margin to a prescribed distance. The prescribed distance is a distance in the sub scanning direction between the top line of the sheet edge detection region R1 and a prescribed farthest point. Here, the prescribed farthest point is a point on the trailing edge of the preceding sheet P0 that appears in the sheet edge detection region R1 and a point farthest from the top line in the sub scanning direction when the preceding sheet P0 is skewed at the maximum angle anticipated. Further, the length W is set to a value shorter than the fixed gap Lc so that the leading edge of the succeeding sheet P does not enter the mask region MR. Here, the length W may be set in the form of a line count value.

As can be seen from FIG. 7(B), the sheet edge detection region R1 is divided into two sections (a left side section SL and a right side section SR) by the reference line C parallel to the sub scanning direction. Each of the left and right sections SL and SR is located bordering the reference line C. The mask region MR is further set within one of the sections SL and SR in which a pixel of the top line was found to represent an edge of an original sheet, on the basis of the positional relationship between the reference line C and the main scanning position in the top line of the sheet edge detection region R1 at which the pixel representing the edge of the original sheet was detected. In the example shown in FIG. 7(B), the mask region MR is set in the right side section SR.

The fixed gap Lc is set greater than the distance D1 on the reference line C, as described above. That is, the line sensor 20 starts the reading operation of the succeeding sheet P after the trailing edge of the preceding sheet P0 on the reference line C has passed. Accordingly, the trailing edge of the preceding sheet P0 will essentially never appear on the reference line C within the sheet edge detection region R1.

Further, the preceding sheet P0 and the succeeding sheet P are normally rectangular in shape with straight edges. Therefore, when the trailing edge of the preceding sheet P0 appears in the set of edge image data for the sheet edge detection region R1, this trailing edge will likely appear to be continuous from the position of the trailing edge in the top line toward one of the left and right edges of the preceding sheet P0. For this reason, the mask region MR is set to one side of the sheet edge detection region R1 bordered by the reference line C in the embodiment in order to detect the position coordinates of the leading edge of the succeeding sheet P with accuracy.

Figure 8:
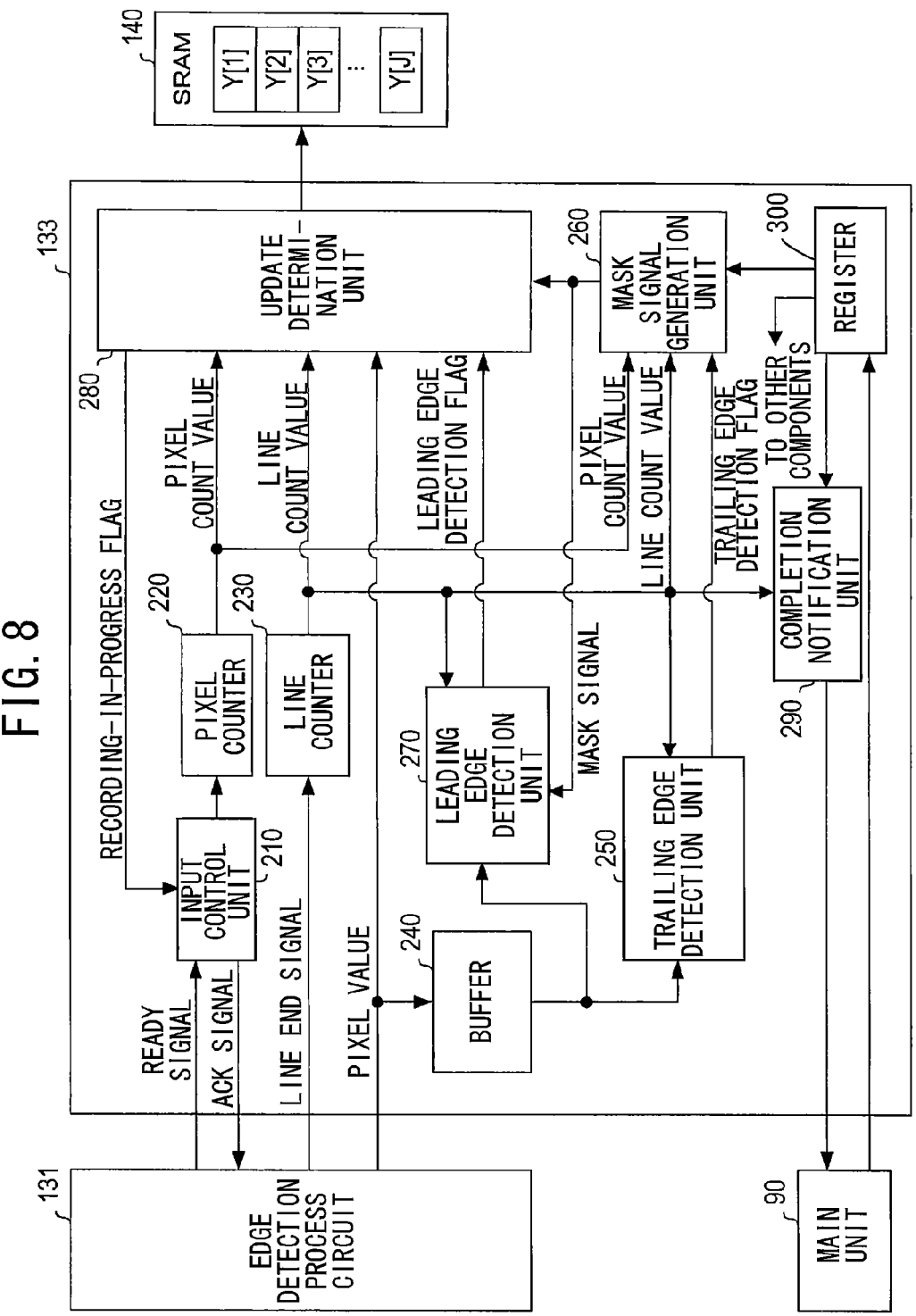
FIG. 8 is a block diagram illustrating a configuration of a sheet leading edge detection circuit according to the embodiment.

Next, the structure of the sheet leading edge detection circuit 133 will be described in greater detail. As shown in FIG. 8, the sheet leading edge detection circuit 133 includes an input control unit 210, a pixel counter 220, a line counter 230, a buffer 240, a trailing edge detection unit 250, a mask signal generation unit 260, a leading edge detection unit 270, an update determination unit 280, a completion notification unit 290, and a register 300.

The input control unit 210 uses ACK signals to respond to ready signals inputted from the edge detection process circuit 131. By using the ACK signals to respond to the ready signals, the input control unit 210 controls input of edge image data from the edge detection process circuit 131 so as to match the progress of processing in the sheet leading edge detection circuit 133. More specifically, the input control unit 210 controls input of edge image data from the edge detection process circuit 131 in units of pixels rather than units of lines.

On the basis of this control, the input control unit 210 inputs a count-up signal into the pixel counter 220 each time the edge detection process circuit 131 inputs, into the sheet leading edge detection circuit 133, a pixel value ("0" or "1") for a pixel constituting the set of edge image data. The pixel counter 220 increments the pixel count value by 1 for each count-up signal inputted. Hereinafter, the pixel corresponding to the value inputted from the edge detection process circuit 131 into the sheet leading edge detection circuit 133 will be called the "reference pixel," and the line including the reference pixel will be called the "reference line."

The pixel count value represents the main scanning position X corresponding to the pixel value inputted into the sheet leading edge detection circuit 133, i.e., the main scanning position X of the reference pixel. The pixel count value held by the pixel counter 220 is reset to "0" by the input control unit 210 after pixel values for one line worth of data (a set of edge image data) have been inputted into the sheet leading edge detection circuit 133.

Specifically, the edge detection process circuit 131 inputs a line-end signal each time one line worth of pixel values constituting the set of edge image data have been inputted. The input control unit 210 resets the pixel count value on the basis of this line-end signal.

The line counter 230 increments the line count value each time the line-end is inputted. This line count value indicates the number of lines corresponding to the sets of edge image data that have been inputted from the edge detection process circuit 131. Here, in the embodiment, the line count value "0" indicates the first line of edge image. In other words, the value "the line count value+1" is equal to the number of lines corresponding to the sets of edge image data that have been inputted from the edge detection process circuit 131.

The buffer 240 stores a plurality of pixels worth of pixel values that have been inputted from the edge detection process circuit 131 as a time series. The buffer 240 stores pixels values for a plurality of pixels in order to determine the continuity of edge points in the trailing edge detection unit 250 and the leading edge detection unit 270. The pixel values in the buffer 240 are deleted each time a line-end signal is inputted.

Figure 9A:
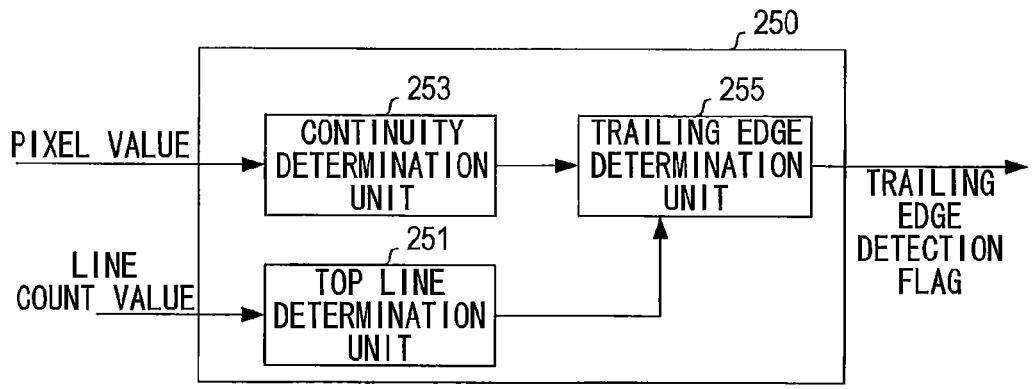
FIG. 9(A) is a block diagram illustrating a configuration of a trailing edge detection unit according to the embodiment.

As shown in FIG. 9(A), the trailing edge detection unit 250 includes a top line determination unit 251, a continuity determination unit 253, and a trailing edge determination unit 255. The top line determination unit 251 determines whether the reference line is the top line in the sheet edge detection region R1 on the basis of the line count value inputted from the line counter 230 and the line count value for the starting line of the sheet edge detection region R1 stored in the register 300, and inputs a signal indicating the determination results into the trailing edge determination unit 255. The line count value corresponding to the starting line of the sheet edge detection region R1 is inputted into the sheet leading edge detection circuit 133 and stored in the register 300 during the process of S220 described above.

The continuity determination unit 253 reads pixel values from the buffer 240 for pixels ranging from the reference pixel to a prescribed preceding pixel. Here, the prescribed preceding pixel has already been inputted from the edge detection process circuit 131 before the reference pixel is inputted. Specifically, the prescribed preceding pixel is a pixel on the same line of the reference pixel, is a pixel that has been inputted prior to the reference pixel, and separates from the reference pixel by the prescribed number of pixel positions (this prescribed number is "H-1", where H will be described below). The continuity determination unit 253 determines whether pixel values for these pixels are all set to the value "1".

A determination threshold H is set in the register 300 during the process of S220. The continuity determination unit 253 refers to the determination threshold H in the register 300. On the basis of the obtained determination threshold H, the continuity determination unit 253 reads pixel values from the buffer 240 for H-1 neighboring pixels based on the reference pixel, and specifically pixel values for pixels ranging from the reference pixel to the prescribed preceding pixel, and determines whether all H pixels (the reference pixel and H-1 neighboring pixels) have the pixel value "1".

When all H continuous pixels have a pixel value of "1", the continuity determination unit 253 inputs a signal into the trailing edge determination unit 255 indicating that the reference pixel represents an edge of the original sheet. If any of the H continuous pixels does not have the pixel value "1", the continuity determination unit 253 inputs a signal into the trailing edge determination unit 255 indicating that the reference pixel does not represent an edge of the original sheet.

The trailing edge determination unit 255 inputs the value "1" into the mask signal generation unit 260 as a trailing edge detection flag when the top line determination unit 251 has determined that the reference line is the top line and the continuity determination unit 253 has determined that the reference pixel represents an edge of an original sheet, and inputs the value "0" into the mask signal generation unit 260 as the trailing edge detection flag in all other cases. A trailing edge detection flag set to the value "1" indicates that the reference pixel is part of the trailing edge of an original sheet.

Note that the interval of pixels (H pixels) in the main scanning direction being checked for continuity is very small compared to the width of the sheet P in the main scanning direction. Therefore, in a case where the reference pixel represents an edge of the original sheet, the number of edge points are continuous with the reference pixel on the same line in the main scanning direction in the edge image data. The number of edge points will be sufficiently greater than the determination threshold H described above, even when the sheet P is skewed at the maximum angle anticipated.

Figure 9B:
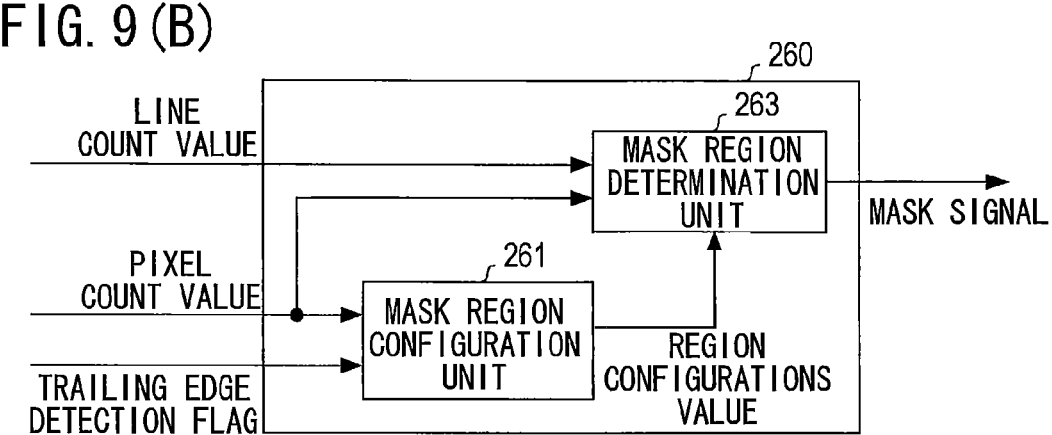
FIG. 9(B) is a block diagram illustrating a configuration of a mask signal generation unit according to the embodiment.

As shown in FIG. 9(B), the mask signal generation unit 260 includes a mask region configuration unit 261, and a mask region determination unit 263. The mask region configuration unit 261 configures the mask region MR on the basis of the pixel count value inputted from the pixel counter 220 when the inputted trailing edge detection flag is set to "1".

The mask region configuration unit 261 configures the mask region MR as described above, on the basis of the position of the reference line C (pixel count value) stored in the register 300, the length W in the sub scanning direction of the mask region MR, the position (line count value) for the starting line of the sheet edge detection region R1, and ON/OFF data for the mask function. The data is written to the register 300 by the main unit 90 in the process of S220.

Specifically, the mask region configuration unit 261 sets the mask region MR by determining the positions for the starting line and the ending line of the mask region MR and the range of the mask region MR in the main scanning direction on the basis of the pixel count value of the reference pixel and the above data stored in the register 300.

The mask region configuration unit 261 inputs region configuration values representing the range of the mask region MR into the mask region determination unit 263. In the region configuration values, the positions of the starting line and the ending line for the mask region MR are set in a form of line count values, while the range of the mask region MR in the main scanning direction can be set in the form of pixel count values.

However, the mask region configuration unit 261 does not configure a mask region MR when the ON/OFF data for the mask function is set to OFF. Since there is no preceding sheet to the firstly conveyed sheet P, the main unit 90 writes a value indicating OFF to the register 300 as the ON/OFF data for the mask function. When a preceding sheet P0 does exist, the main unit 90 writes a value indicating ON to the register 300 as the ON/OFF data for the mask function in S220. After configuring the mask region MR, the mask region configuration unit 261 does not reconfigure the mask region MR until the sheet leading edge detection circuit 133 is initialized the next time the main unit 90 performs the process in S220.

The mask region determination unit 263 determines whether the reference pixel falls within the mask region MR on the basis of the line count value inputted from the line counter 230, the pixel count value inputted from the pixel counter 220, and the region configuration values inputted from the mask region configuration unit 261. When the reference pixel falls in the mask region MR, the mask region determination unit 263 inputs an ON signal into the leading edge detection unit 270 (FIG. 8) and the update determination unit 280 (FIG. 8) as the mask signal. When the reference pixel falls outside the mask region MR, the mask region determination unit 263 inputs an OFF signal into the leading edge detection unit 270 and the update determination unit 280 as the mask signal. If the mask region configuration unit 261 has not configured the mask region MR, the mask region determination unit 263 inputs an OFF signal into the leading edge detection unit 270 and the update determination unit 280 as the mask signal.

Figure 9C:
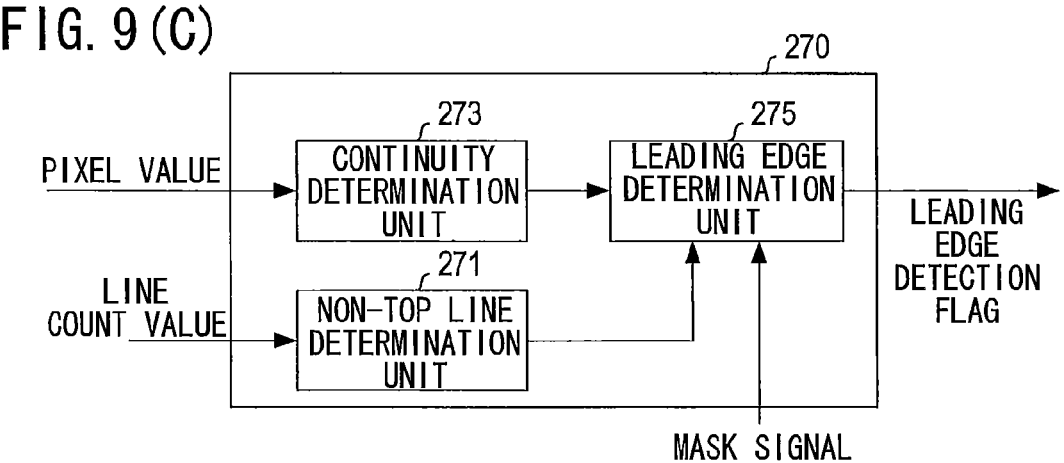
FIG. 9(C) is a block diagram illustrating a configuration of a leading edge detection unit according to the embodiment.

As shown in FIG. 9(C), the leading edge detection unit 270 includes a non-top line determination unit 271, a continuity determination unit 273, and a leading edge determination unit 275. The non-top line determination unit 271 determines whether the reference line is a line other than the top line in the sheet edge detection region R1 (i.e., the second or subsequent lines) on the basis of the line count value inputted from the line counter 230, and the line count value for the starting line of the sheet edge detection region R1 stored in the register 300. The non-top line determination unit 271 inputs a signal representing the determination results to the leading edge determination unit 275.

The continuity determination unit 273 operates similarly to the continuity determination unit 253 of the trailing edge detection unit 250, inputting a signal into the leading edge determination unit 275 indicating whether the reference pixel represents an edge of an original sheet.

The leading edge determination unit 275 inputs a value "0" or a value "1" into the update determination unit 280 (FIG. 8) as a leading edge detection flag according to the rules described below and on the basis of the determination results from the non-top line determination unit 271, the determination results from the continuity determination unit 273, and the mask signal from the mask signal generation unit 260.

More specifically, the leading edge determination unit 275 inputs the value "1" into the update determination unit 280 as the leading edge detection flag when the non-top line determination unit 271 has determined that the reference line is one of the second or subsequent lines in the sheet edge detection region R1, the continuity determination unit 273 has determined that the reference pixel represents an edge of an original sheet, and the mask signal is an OFF signal indicating that the reference pixel falls outside the mask region MR, and inputs the value "0" into the update determination unit 280 as the leading edge detection flag in all other cases.

However, once the value "0" is replaced by the value "1" for the leading edge detection flag, the leading edge determination unit 275 maintains the leading edge detection flag inputted into the update determination unit 280 at the value "1", regardless of the rules described above, until the sheet leading edge detection circuit 133 has referenced all pixels in the last line of the sheet edge detection region R1. The value of the leading edge detection flag is maintained at "1" because the leading edge of the sheet P will likely be continuously present once it has been detected.

Figure 10:
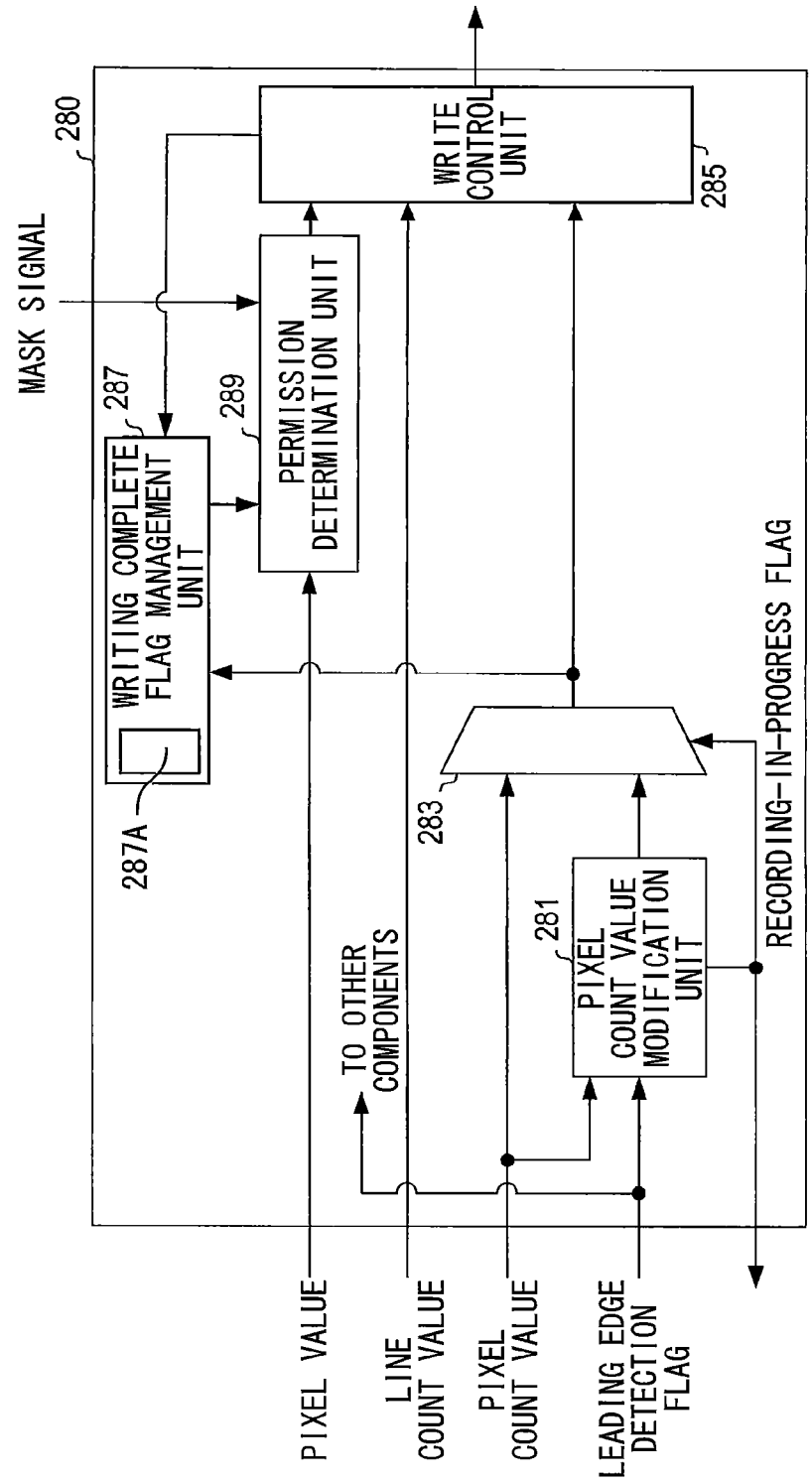
FIG. 10 is a block diagram illustrating a configuration of an update determination unit.

As shown in FIG. 10, the update determination unit 280 includes a pixel count value modification unit 281, a selector 283, a write control unit 285, a writing complete flag management unit 287, and a permission determination unit 289. Each of the pixel count value modification unit 281, the selector 283, the write control unit 285, the writing complete flag management unit 287, and the permission determination unit 289 begins operating once the leading edge detection flag inputted from the leading edge determination unit 275 changes from "0" to "1".

The pixel count value modification unit 281 inputs a value "0" or "1" into the selector 283 and the input control unit 210 as a recording-in-progress flag. More specifically, when the leading edge detection flag inputted from the leading edge determination unit 275 changes to "1" from "0", the pixel count value modification unit 281 begins an operation to input the value "1" into the selector 283 and the input control unit 210 as the recording-in-progress flag.

In addition, while inputting the value "1" into the selector 283 as the recording-in-progress flag, the pixel count value modification unit 281 sequentially generates values Xc-(H-1), Xc-(H-2), . . . , Xc-1, and Xc by modifying the pixel count value Xc inputted from the pixel counter 220 on the basis of the determination threshold H. The pixel count value modification unit 281 sequentially inputs, as the pixel count value, the modified values Xc-(H-1), Xc-(H-2), . . . , Xc-1, and Xc to the selector 283 in this order. After modifying the pixel count value Xc from Xc-(H-1) to Xc (or after inputting the pixel values Xc-(H-1), Xc-(H-2), . . . , Xc-1, and Xc to the selector 283), the pixel count value modification unit 281 changes the recording-in-progress flag to "0".

As described above, when it has been determined that the reference pixel represents the leading edge of a sheet P, there are H consecutive pixels from the prescribed preceding pixel to the reference pixel that have the pixel value "1". In the embodiment, all H pixels are considered pixels representing the leading edge of the sheet P and the sub scanning position Y of these pixels is written to the SRAM 140. Accordingly, the pixel count value modification unit 281 modifies the pixel count value.

It is necessary to temporarily halt the input of pixel values from the edge detection process circuit 131 while modifying the pixel count value. It is for this reason that the pixel count value modification unit 281 inputs the recording-in-progress flag into the input control unit 210. The input control unit 210 halts the input of pixel values from the edge detection process circuit 131 when the recording-in-progress flag is "1" and restarts the input of pixel values from the edge detection process circuit 131 when the recording-in-progress flag changes to "0".

The selector 283 inputs one of the pixel count value received from the pixel counter 220 or the modified pixel count value received from the pixel count value modification unit 281 into the write control unit 285 and the writing complete flag management unit 287. Specifically, the selector 283 inputs the pixel count value from the pixel count value modification unit 281 into the write control unit 285 and the writing complete flag management unit 287 when the recording-in-progress flag is "1" and inputs the pixel count value from the pixel counter 220 into the write control unit 285 and the writing complete flag management unit 287 when the recording-in-progress flag is "0".

The write control unit 285 does not execute an operation to record position coordinates in the SRAM 140 for the leading edge of the sheet P when a "0" is inputted from the permission determination unit 289 as a write permission signal, and executes the operation to record position coordinates in the SRAM 140 when a "1" is inputted as the write permission signal.

More specifically, when the inputted write permission signal is a "1", the write control unit 285 writes the line count value inputted form the line counter 230 to the area of the SRAM 140 corresponding to the pixel count value inputted from the selector 283 as the sub scanning position Y for the leading edge of the sheet P. In this way, the write control unit 285 can record position coordinates for the pixel corresponding to the pixel count value inputted from the selector 283 and the line count value inputted from the line counter 230 in the SRAM 140 as the position coordinates of a pixel representing the leading edge of the sheet P. The write control unit 285 inputs an ON signal into the writing complete flag management unit 287 when recording operation has been performed and inputs an OFF signal into the writing complete flag management unit 287 at all other times.

When the write control unit 285 inputs an ON signal into the writing complete flag management unit 287, the writing complete flag management unit 287 sets the writing complete flag corresponding to the pixel count value inputted from the selector 283 to the value "1". The writing complete flag management unit 287 is provided with a flag storage unit 287A for storing writing complete flags for positions corresponding to each pixel in the main scanning direction.

When the operation for recording the sub scanning position Y at the leading edge of the sheet P for the corresponding main scanning position X is complete, the writing complete flag is set to the value "1" for the corresponding main scanning position X in the flag storage unit 287A. When the operation for recording the sub scanning position Y at the leading edge of the sheet P for the corresponding main scanning position is not complete, the writing complete flag is set to the value "0" for the corresponding main scanning position X in the flag storage unit 287A. The writing complete flags are initialized to "0" when the sheet leading edge detection circuit 133 is initialized in the process of S220.

The writing complete flag management unit 287 also inputs the current value of the writing complete flag corresponding to the pixel count value inputted from the selector 283 into the permission determination unit 289.

After the leading edge detection flag changes from "0" to "1", the permission determination unit 289 inputs either a "1" or a "0" into the write control unit 285 as the write permission signal on the basis of the pixel value of the reference pixel inputted from the edge detection process circuit 131, the writing complete flag for the reference pixel inputted form the writing complete flag management unit 287, and the mask signal inputted from the mask signal generation unit 260.

More specifically, the permission determination unit 289 inputs the value "1" into the write control unit 285 as the write permission signal when the pixel value of the reference pixel is "1", the writing complete flag for the reference pixel is "0", and the mask signal is an OFF signal; and inputs the value "0" into the write control unit 285 as the write permission signal in all other cases.

The write control unit 285 executes an operation to record the leading edge of the sheet P in the SRAM 140 on the basis of the write permission signal. Through this process, for a main scanning position X, the write control unit 285 records a sub scanning position Y in the SRAM 140 corresponding to the pixel that is closest to the top line of the sheet edge detection region R1 in the sub scanning direction among pixels at the main scanning position X, that represents an edge of an original sheet, and that is outside the mask region MR in the sheet edge detection region R1, and repeats this process for each main scanning position X. When initializing the sheet leading edge detection circuit 133 in S220, the main unit 90 sets the initial values for sub scanning positions Y in the SRAM 140 to the last line position Yn of the sheet edge detection region R1, as described above.

The completion notification unit 290 (FIG. 8) determines whether the sheet leading edge detection circuit 133 has referenced all sets of edge image data in the sheet edge detection region R1 on the basis of the line count value inputted from the line counter 230, and the line count value of the last line in the sheet edge detection region R1 stored in the register 300. When all sets of edge image data have been referenced, the completion notification unit 290 inputs a completion notification signal into the main unit 90.

With the image-reading device 1 according to the embodiment described above, the trailing edge detection unit 250 inputs a value "1" into the mask signal generation unit 260 as the trailing edge detection flag when the edge of an original sheet was detected in the sets of edge image data for the top line of the sheet edge detection region R1. When the value "1" is inputted as the trailing edge detection flag, the mask signal generation unit 260 prohibits any position coordinates being recorded in the SRAM 140 for the edge of an original sheet detected in the mask region MR of the sheet edge detection region R1 having a prescribed length W in the sub scanning direction from the top line.

More specifically, the mask signal generation unit 260 inputs an ON signal into the leading edge detection unit 270 and the update determination unit 280 as a mask signal when a reference pixel falls within the mask region MR to prohibit the position coordinates of the reference pixel from being recorded in the SRAM 140.

Therefore, the image-reading device 1 according to the embodiment can prevent the trailing edge of a preceding sheet P0 from being mistakenly detected as the leading edge of the targeted succeeding sheet P and, hence, can prevent the position coordinates of this trailing edge from being mistakenly recorded in the SRAM 140. Thus, the image-reading device 1 stores highly reliable data in the SRAM 140 that represents the position coordinates for the leading edge of the sheet P. Consequently, the size and skew angle of the sheet P can be detected with high precision on the basis of this reliable data, enabling the image-reading device 1 to perform high-precision processes, including skew correction, original image extraction, and other processes.

A particular feature of the embodiment described above is that the mask region MR can be configured with a limited dimension in the main scanning direction by using the facts that the conveying gap L between the preceding sheet P0 and the succeeding sheet P is maintained at the fixed gap Lc along the reference line C and that the sheets P are rectangular in shape with straight edges.

More specifically, when the trailing edge of the preceding sheet P0 appears in the sheet edge detection region R1, the embodiment focuses on the extremely high probability that this trailing edge will appear continuously from the position of the trailing edge appearing in the top line of the sheet edge detection region R1 toward either the left or right side of the sheet P. The mask region MR is then set to a section on the side of the reference line C in which the pixel in the top line of the sheet edge detection region R1 representing an edge of an original sheet was detected. Therefore, the embodiment can suppress the leading edge of the succeeding sheet P from entering the mask region, enabling the image-reading device 1 to detect position coordinates of the leading edge of the succeeding sheet P with high accuracy.

Further, once a sub scanning position Y is recorded in the SRAM 140 for a main scanning position X, the image-reading device 1 of the embodiment does not modify the recorded value in the SRAM 140, even when the reference pixel has a pixel value "1". Here, it is possible that the sheet P contains lines or diagrams that may be identified as edge points in the edge image data. If the recorded values in the SRAM 140 were modified for all reference pixels set to "1", lines and the like in the sheet P would influence this recording, making it impossible to store the correct position coordinates in the SRAM 140 for the edge of an original sheet.

In this way, the embodiment described above suppresses the effects of the trailing edge of a preceding sheet P0 and lines and figures in the sheet P that can potentially be erroneously detected as the leading edge of the succeeding sheet P, and can detect the position coordinates for the leading edge of the succeeding sheet P with high accuracy, making the image-reading device 1 of the embodiment exceptionally useful.

While the invention has been described in detail with reference to the embodiment thereof, it would be apparent to those skilled in the art that various changes and modifications may be made therein.

For example, the leading edge determination unit 275 need not be configured to maintain the value of the leading edge detection flag at "1" after the value was changed from "0" to "1". In other words, once the value of the leading edge detection flag has changed from "0" to "1", the leading edge determination unit 275 may be configured to switch the flag between the values "0" and "1" according to the same rule used up to that point.

In this case, the permission determination unit 289 inputs the value "1" into the write control unit 285 as the write permission signal when the leading edge detection flag is set to "1" and the writing complete flag for the reference pixel is set to "0", and inputs the value "0" into the write control unit 285 as the write permission signal in all other cases.

The embodiment described above gives a detailed description for the structure of the sheet leading edge detection circuit 133 as a hardware circuit, but the functions implemented by the sheet edge detection circuit 130 that includes the sheet leading edge detection circuit 133 may be implemented in software through data processes executed by a computer. In this case, the ROM 93 stores a program for the software. The program for the software is executed by the CPU 91, for example. The embodiment of the invention described above may be modified in various other ways without departing from the scope of the invention, the scope of which is defined by the attached claims.

The line sensor 20 corresponds to a reading unit. The separating mechanism 30, the conveying mechanism 40, and the driving device 60, the power transmission mechanism 65, and the conveyance control unit 87 correspond to a conveyance unit. The sheet sensor 70 corresponds to a detector. The process of S220 in which the main unit 90 sets the starting line and the ending line of the sheet edge detection region R1 corresponds to a process performed by a first determination unit. The edge detection process circuit 131 corresponds to an edge image generation unit.

The trailing edge detection unit 250 and the mask signal generation unit 260 correspond to a mask setting unit. Further, the trailing edge detection unit 250 corresponds to a trailing edge detection unit. The mask signal generation unit 260 corresponds to a prohibiting unit.

The leading edge detection unit 270 and the update determination unit 280 correspond to an edge detection unit and a recordation unit. The SRAM 140 corresponds to a storing unit. The flag storage unit 287A corresponds to a flag storing unit. The permission determination unit 289 corresponds to a second determination unit. The control unit 285 corresponds to a recordation unit. The complete flag management unit 287 corresponds to a flag recording unit.

What is claimed is:

1. An image-reading device comprising:
   a reading unit configured to optically read an object at a reading position, the object including a sheet, the reading unit being further configured to generate a plurality of sets of line data respectively representing a plurality of lines in an image of the object, each of the plurality of lines having pixels arranged in a first direction, the sheet having a sheet edge;
   a conveyance unit configured to convey the sheet in a second direction intersecting with the first direction;
   a detector positioned upstream of the reading position in the second direction and configured to detect the sheet and output a sheet detection signal when the sheet is detected;
   a first determination unit configured to determine a plurality of sets of target data from among the plurality of sets of line data in response to the sheet detection signal, the plurality of sets of target data respectively representing a plurality of target lines among the plurality of lines and being used to detect the sheet edge;
   an edge image generation unit configured to generate a plurality of sets of edge image data by performing an edge detection process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line;
   a mask setting unit configured to determine whether an edge pixel is included in the first set of edge image data, the edge pixel representing at least part of the sheet edge, the mask setting unit being configured to, when the edge pixel is included in the first set of edge image data, set a mask region on the image, the mask region including a part of the plurality of lines based on the first target line; and
   an edge detection unit configured to detect the edge pixel by sequentially referring to each of the plurality of sets of edge image data except the first set of edge image data according to a line order from the second target line and detect a positional coordinate of the edge pixel from among pixels in the plurality of sets of edge image data outside the mask region.

2. The image-reading device according to claim 1, wherein the positional coordinate is represented by a first position with respect to the first direction and a second position with respect to the second direction,
   the image-reading device further comprising a storing unit configured to store, as a plurality of positional coordinates for edge pixels, a plurality of second positions of the edge pixels in such a manner that, for each of the edge pixels, a second position is correlated to a corresponding first position,
   wherein the edge detection unit is configured to detect the edge pixels by sequentially referring to at least one pixel located at each first position according to the line order, and record the plurality of second positions for the edge pixels in the storing unit,
   wherein once the edge detection unit records a second position correlated to one first position, detection of the positional coordinate of the one first position is completed,
   wherein a second position of a pixel that is positioned in the mask region is prohibited from being stored as a positional coordinate of the edge pixel in the storing unit.

3. The image-reading device according to claim 2, further comprising:
   a flag storing unit configured to store a complete flag for each of the plurality of first positions;
   a second determination unit configured to determine whether a complete flag is set for a first position of a currently referred-to pixel when the currently referred-to pixel is the edge pixel;
   a recordation unit, when the edge detection unit determines that the complete flag is not set for the first position of the currently referred-to pixel and that the currently referred-to pixel is positioned outside the mask region, configured to record a second position of the currently referred-to pixel correlated to a corresponding first position in the storing unit as the positional coordinate of the edge pixel; and
   a flag recording unit configured to record, in the flag storing unit, the complete flag for the first position of the currently referred-to pixel whose second position correlated to the corresponding first position is recorded by the recordation unit.

4. The image-reading device according to claim 1, wherein the image is divided into a first area and a second area by a reference line,
   wherein the edge detection unit is configured to detect the edge pixels by sequentially referring to each pixel in the first set of edge image data,
   wherein when the first set of edge image data includes the edge pixel located in either one of the first area and the second area, the mask setting unit sets the mask region so as to be included in the either one of the first area and the second area.

5. The image-reading device according to claim 4, wherein the mask region has a first length in the second direction,
wherein the conveyance unit includes a roller positioned upstream of the reading position in the second direction, the roller being configured to convey a plurality of sheets one at a time toward downstream in the second direction so that a gap between two successively conveyed sheets has a second length larger than the first length on the reference line.

6. The image-reading device according to claim 1, wherein when prescribed number of candidate pixels each having a value representing at least part of the sheet edge are continuously arranged in the first direction, the edge detection unit is configured to detect the candidate pixels as edge pixels.

7. An image-reading device comprising:
a reading unit configured to optically read an object at a reading position, the object including a sheet, the reading unit being further configured to generate a plurality of sets of line data respectively representing a plurality of lines in an image of the object, each of the plurality of lines having pixels arranged in a first direction, the sheet having a sheet edge;
a conveyance unit configured to convey the sheet in a second direction intersecting with the first direction;
a detector positioned upstream of the reading position in the second direction and configured to detect the sheet and output a sheet detection signal when the sheet is detected;
a first determination unit configured to determine a plurality of sets of target data from among the plurality of sets of line data in response to the sheet detection signal, the plurality of sets of target data respectively representing a plurality of target lines among the plurality of lines and being used to detect the sheet edge;
an edge image generation unit configured to generate a plurality of sets of edge image data by performing an image process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line;
a trailing edge detection unit configured to determine whether an edge pixel representing at least part of the sheet edge is included in the first set of edge image data, the trailing edge detection unit generating a trailing edge signal when the edge pixel is included in the first set of edge image data;
a recordation unit configured to detect an edge pixel by sequentially referring to each of the plurality of sets of edge image data except the first set of edge image data according to a line order from the second target line, the recordation unit being configured to record a positional coordinate of the edge pixel, as at least part of a trailing edge of the sheet, in a storing unit when the edge pixel is detected; and
a prohibiting unit configured to prohibit the recordation unit from recording a positional coordinate of an edge pixel included in a prescribed region based on the first target line when the trailing edge detection unit generates the trailing edge signal.

8. The image-reading device according to claim 7, wherein the positional coordinate is represented by a first position with respect to the first direction and a second position with respect to the second direction,
wherein the storing unit is configured to store, as a plurality of positional coordinates of the edge pixels, a plurality of second positions for edge pixels in such a manner that, for each of the edge pixels, a second position is correlated to a corresponding first position,
wherein the recordation unit is configured to record, as the plurality of positional coordinates for the edge pixels, a plurality of second positions in the storing unit in such a manner that, for each of the edge pixels, a second position is correlated to a corresponding first position.

9. The image-reading device according to claim 8, further comprising:
a flag storing unit configured to store complete flags for the plurality of first positions; and
a flag setting unit configured to record a complete flag for a first position of the pixel whose second position correlated to the corresponding first position is recorded by the recordation unit in the flag storing unit,
wherein once a complete flag is set for one first position, the recordation unit does not update a positional coordinate of the one first position recorded in the storing unit.

10. The image-reading device according to claim 7, wherein the image is divided into a first area and a second area by a reference line,
wherein when the first set of edge image data includes the edge pixel located in either one of the first area and the second area, the prohibiting unit sets the prescribed region so as to be included in the either one of the first area and the second area.

11. A non-transitory computer readable storage medium storing a set of program instructions installed on and executed by a computer for controlling an image reading device, the program instructions comprising:
controlling a reading unit to optically read an object at a reading position, the object including a sheet, the controlling including generating a plurality of sets of line data respectively representing a plurality of lines in an image of the object, each of the plurality of lines having pixels arranged in a first direction, the sheet having a sheet edge;
controlling conveyance of the sheet in a second direction intersecting with the first direction;
detecting the sheet using a detector positioned upstream of the reading position in the second direction;
determining a plurality of sets of target data from among the plurality of sets of line data in response to detection of the sheet, the plurality of sets of target data respectively representing a plurality of target lines among the plurality of lines and being used to detect the sheet edge;
generating a plurality of sets of edge image data by performing an edge detection process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line;

determining whether an edge pixel is included in the first set of edge image data, the edge pixel representing at least part of the sheet edge;

setting, when the edge pixel is included in the first set of edge image data, a mask region on the image, the mask region including the part of the plurality of lines based on the first target line;

detecting the edge pixel by sequentially referring to each of the plurality of sets of edge image data except the first set of edge image data according to a line order from the second target line; and detecting a positional coordinate of the edge pixel from among pixels in the plurality of sets of edge image data outside the mask region.

12. A non-transitory computer readable storage medium storing a set of program instructions installed on and executed by a computer for controlling an image reading device, the program instructions comprising:

controlling a reading unit to optically read an object at a reading position, the object including a sheet, the controlling including generating a plurality of sets of line data respectively representing a plurality of lines in an image of the object, each of the plurality of lines having pixels arranged in a first direction, the sheet having a sheet edge;

controlling conveyance of the sheet in a second direction intersecting with the first direction;

detecting the sheet using a detector positioned upstream of the reading position in the second direction;

determining a plurality of sets of target data from among the plurality of sets of line data in response to detection of the sheet, the plurality of sets of target data respectively representing a plurality of target lines among the plurality of lines and being used to detect the sheet edge;

generating a plurality of sets of edge image data by performing an image process on the plurality of sets of target data, the plurality of sets of edge image data respectively corresponding to the plurality of target lines, the plurality of target lines having a first target line and being apposed sequentially on a line-to-line basis in the second direction from the first target line, the plurality of sets of edge image data including a first set of edge image data and a second set of edge image data, the first set of edge image data corresponding to the first target line, the second set of edge image data corresponding to a second target line apposed next to the first target line;

determining whether an edge pixel representing at least part of the sheet edge is included in the first set of edge image data;

generating a trailing edge signal when the edge pixel is included in the first set of edge image data;

detecting an edge pixel by sequentially referring to each of the plurality of sets of edge image data except the first set of edge image data according to a line order from the second target line;

recording a positional coordinate of the edge pixel, as at least part of a trailing edge of the sheet, in a storing unit when the edge pixel is detected; and prohibiting the recording from recording positional a coordinate of an edge pixel included in a prescribed region based on the first target line when the trailing edge signal is generated.

\* \* \* \* \*